(12) United States Patent
Kim et al.

(10) Patent No.: US 7,675,516 B2
(45) Date of Patent: Mar. 9, 2010

(54) APPARATUS AND METHOD FOR TRIANGULATING 3D IMAGE AND COMPUTER-READABLE RECORDING MEDIUM STORING COMPUTER PROGRAM FOR CONTROLLING THE APPARATUS

(75) Inventors: Keunho Kim, Seoul (KR); Seokyoon Jung, Seoul (KR); Sergei Ivanovich Vyatkin, Novosibirsk (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 475 days.

(21) Appl. No.: 11/347,428

(22) Filed: Feb. 6, 2006

(65) Prior Publication Data

US 2006/0176297 A1    Aug. 10, 2006

(30) Foreign Application Priority Data

Feb. 4, 2005    (KR) .................. 10-2005-0010819

(51) Int. Cl.
*G06T 15/30* (2006.01)

(52) U.S. Cl. .................. 345/423; 345/419; 345/420; 345/421; 382/254; 382/154

(58) Field of Classification Search .................. 345/419, 345/420
See application file for complete search history.

(56) References Cited

U.S. PATENT DOCUMENTS

| | | | | |
|---|---|---|---|---|
| 5,428,717 A | * | 6/1995 | Glassner | ............... 345/423 |
| 6,100,893 A | * | 8/2000 | Ensz et al. | ............... 345/420 |
| 6,208,347 B1 | * | 3/2001 | Migdal et al. | ............... 345/419 |
| 6,518,963 B1 | * | 2/2003 | Waupotitsch et al. | ........ 345/419 |
| 6,650,324 B1 | * | 11/2003 | Junkins | ............... 345/423 |
| 6,982,710 B2 | * | 1/2006 | Salomie | ............... 345/420 |
| 7,030,881 B2 | * | 4/2006 | Perry et al. | ............... 345/441 |
| 7,038,681 B2 | * | 5/2006 | Scott et al. | ............... 345/440 |
| 7,055,119 B2 | * | 5/2006 | Bartley et al. | ............... 716/8 |
| 7,075,532 B2 | * | 7/2006 | Mukherjee et al. | ............... 345/423 |
| 7,079,135 B2 | * | 7/2006 | Kim | ............... 345/420 |
| 7,272,264 B2 | * | 9/2007 | ElShishiny et al. | ............... 382/254 |
| 7,283,140 B2 | * | 10/2007 | Zhou et al. | ............... 345/582 |
| 2003/0151604 A1 | * | 8/2003 | Kaufman et al. | ............... 345/419 |
| 2006/0290695 A1 | * | 12/2006 | Salomie | ............... 345/420 |

* cited by examiner

*Primary Examiner*—M Good Johnson
(74) *Attorney, Agent, or Firm*—Staas & Halsey LLP

(57) ABSTRACT

Provided are an apparatus and method for triangulating a three-dimensional (3D) image, and a computer-readable recording medium storing a computer program for controlling the apparatus. The apparatus includes: a surface expression unit expressing the surface of the 3D image as triangles without holes; and an information output unit outputting a result obtained by the surface expression unit. The apparatus quickly and easily finds surface points and expresses the surface of the 3D image as a combination of triangles reliably, generally, and efficiently, more accurately obtains the 4-sided polygons, reduces the number of holes to be formed, is edited by personally recognizing modification of the surface of the 3D image, and can be used as a tool for expressing intuitive data to edit a dynamic object.

25 Claims, 21 Drawing Sheets
(13 of 21 Drawing Sheet(s) Filed in Color)

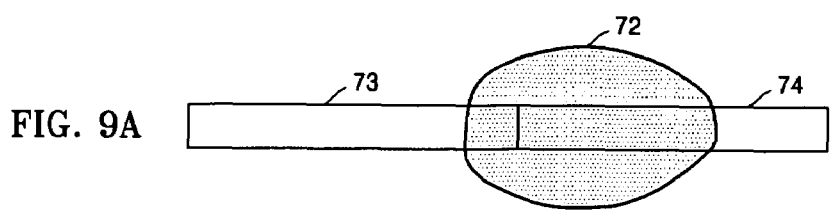
FIG. 9A
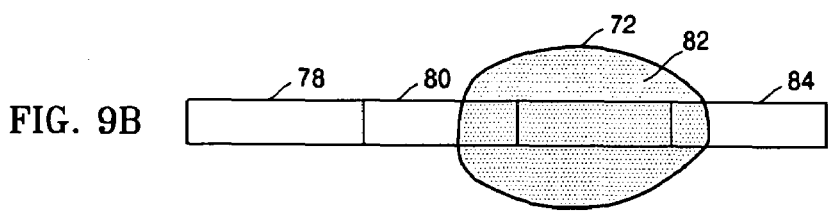
FIG. 9B
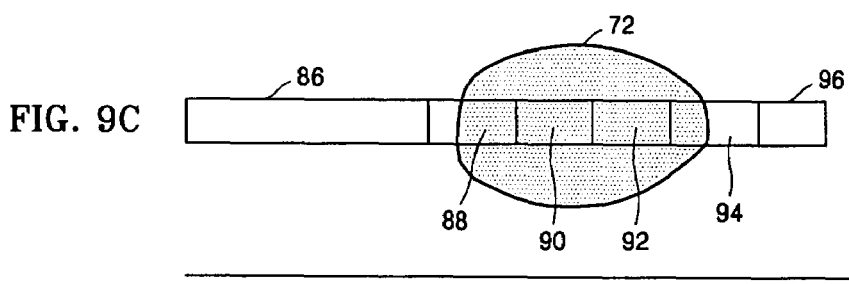
FIG. 9C
FIG. 10
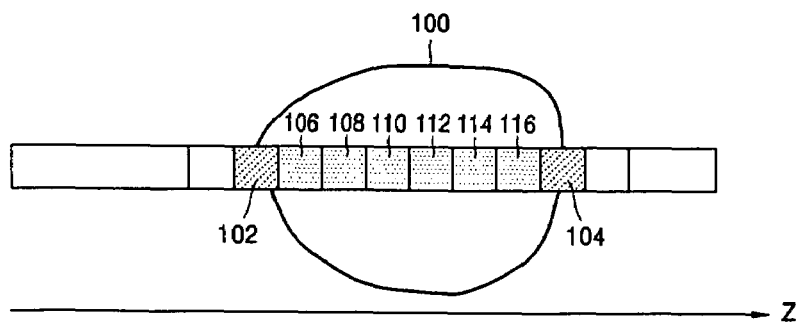

(dY, dZ)=(0, 1)   (dY, dZ)=(0, -1)

FIG. 21
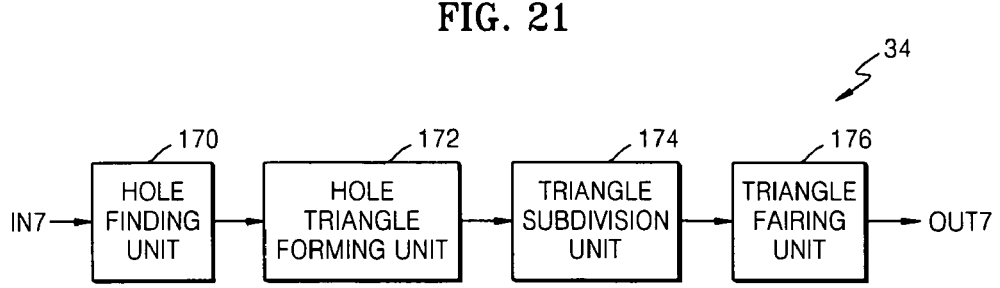
FIG. 22
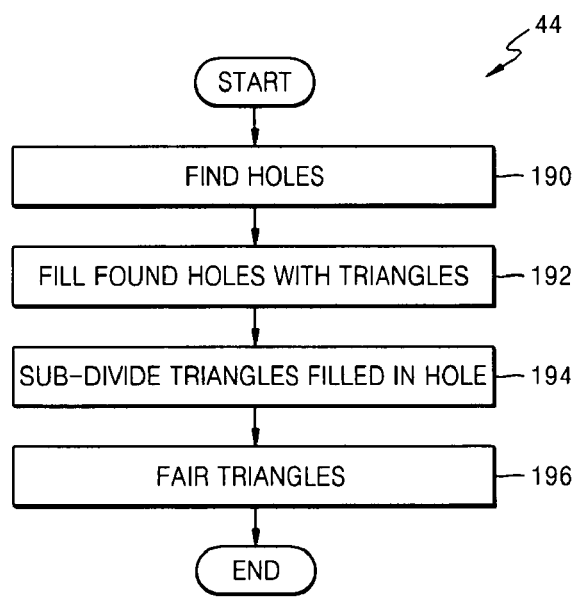
FIG. 23A    FIG. 23B
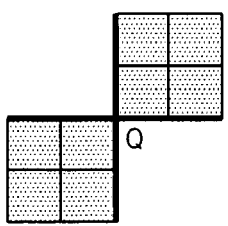    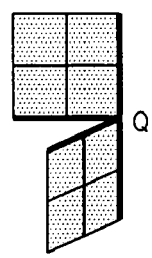

APPARATUS AND METHOD FOR TRIANGULATING 3D IMAGE AND COMPUTER-READABLE RECORDING MEDIUM STORING COMPUTER PROGRAM FOR CONTROLLING THE APPARATUS

CROSS-REFERENCE TO RELATED APPLICATIONS

This application claims the benefit of Korean Patent Application No. 10-2005-0010819, filed on Feb. 4, 2005, in the Korean Intellectual Property Office, the disclosure of which is incorporated herein in its entirety by reference.

BACKGROUND OF THE INVENTION

1. Field of the Invention

The present invention relates to a computer graphic, and more particularly, to an apparatus and method for triangulating a three-dimensional (3D) image by which the surface of the 3D image is represented by triangles, and a computer-readable recording medium storing a computer program for controlling the apparatus.

2. Description of the Related Art

Conventional rendering methods search all the cells of three-dimensional (3D) space in order to find surface points of a 3D image necessary for rendering. Therefore, when rendering, the rate at which surface points are found is low, and thus the conventional rendering methods require a large amount of computation and cannot be used to precisely find surface points. Further, since other conventional rendering methods capable of reliably finding surface points of the 3D image use a complicated modeling function, they are expensive to render.

SUMMARY OF THE INVENTION

Additional aspects, features, and/or advantages of the invention will be set forth in part in the description which follows and, in part, will be apparent from the description, or may be learned by practice of the invention.

The present invention provides an apparatus and method for triangulating a three-dimensional (3D) image by which the surface of the 3D image is represented by a combination of triangles without holes.

The present invention also provides a computer-readable recording medium storing a program for controlling the apparatus for triangulating a 3D image.

According to an aspect of the present invention, there is provided an n apparatus for triangulating the surface of a three-dimensional (3D) image, the apparatus comprising: a surface expression unit expressing the surface of the 3D image as triangles without holes; and an information output unit outputting a result obtained by the surface expression unit.

According to another aspect of the present invention, there is provided a method of triangulating the surface of a 3D image, the method comprising: expressing the surface of the 3D image as triangles without holes; and outputting a result obtained by the expressing the surface as triangles.

According to another aspect of the present invention, there is provided at least one computer-readable medium storing instructions that control at least one processor to perform a method for controlling an apparatus for triangulating the surface of a 3D image, the method comprising: expressing the surface of the 3D image as triangles without holes; and outputting a result obtained by the expressing the surface as triangles.

According to another aspect of the present invention, there is provided a method in a computer system for triangulating the surface of a 3D image and displaying the 3D image, the method comprising: expressing the surface of the 3D image as triangles without holes; outputting a result obtained by the expressing of the surface as triangles; and displaying the 3D image based on the result.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the present invention will become apparent and more readily appreciated from the following description of exemplary embodiments, taken in conjunction with the accompanying drawings of which:

FIGS. 9A through 9C are diagrams illustrating binary division of a bar formed by light irradiated in a Z direction;

FIG. 10 is a diagram illustrating a group of points found by the surface point search unit;

FIG. 21 is a block diagram illustrating a hole processor illustrated in FIG. 3;

FIG. 22 is a flowchart of Operation 44 illustrated in FIG. 4;

FIG. 23A is a diagram illustrating self-intersecting holes;

FIG. 23B is a diagram illustrating holes that are not filled with triangles;

DETAILED DESCRIPTION OF THE PREFERRED EMBODIMENTS

Figure 1:
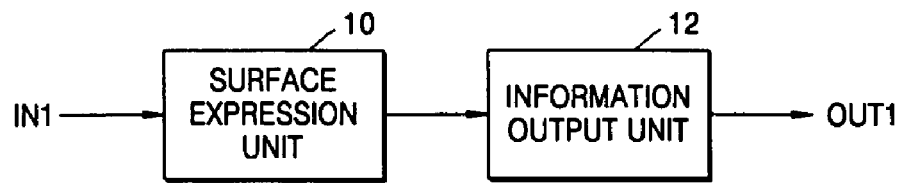
FIG. 1 is a block diagram of an apparatus for triangulating a three-dimensional (3D) image according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram of an apparatus for triangulating a three-dimensional (3D) image according to an exemplary embodiment of the present invention. Referring to FIG. 1, the apparatus includes a surface representation unit 10 and an information output unit 12.

Figure 2:
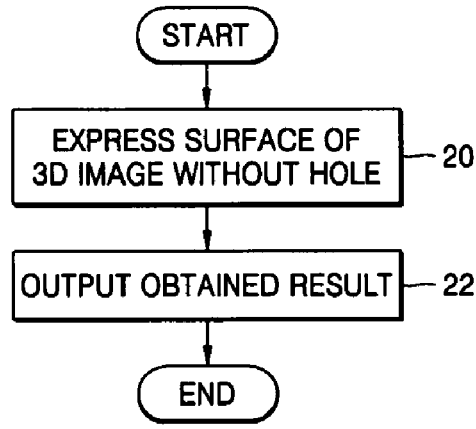
FIG. 2 is a flowchart illustrating a method of triangulating a 3D image according to an exemplary embodiment of the present invention.

FIG. 2 is a flowchart illustrating a method of triangulating a 3D image according to an exemplary embodiment of the present invention. Referring to FIG. 2, the method comprises representing the 3D image without a hole (Operation 20) and outputting a result obtained by representing the 3D image (Operation 22).

The apparatus for triangulating a 3D image illustrated in FIG. 1 divides the surface of a 3D image into triangles using the method of triangulating a 3D image illustrated in FIG. 2 as described below.

The surface representation unit 10 represents the surface of the 3D image, which is input via an input terminal IN1, as triangles without holes (Operation 20), and outputs a result obtained by representing the surface of the 3D image as triangles without holes to the information output unit 12 (Operation 22).

Figure 3:
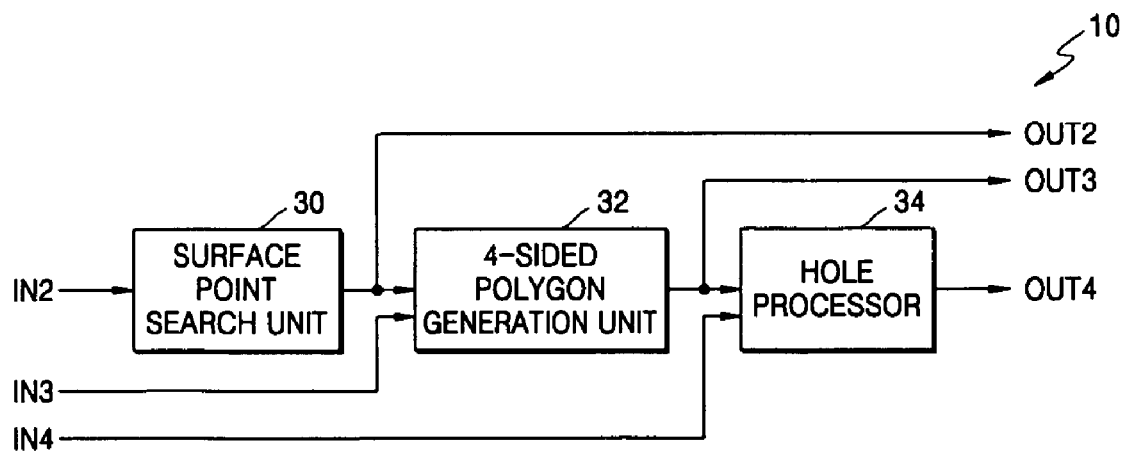
FIG. 3 is a block diagram of a surface representation unit illustrated in FIG. 1.

FIG. 3 is a block diagram of the surface representation unit 10 illustrated in FIG. 1. Referring to FIG. 3, the surface representation unit 10 includes a surface point search unit 30, a 4-sided polygon generation unit 32, and a hole processor 34.

Figure 4:
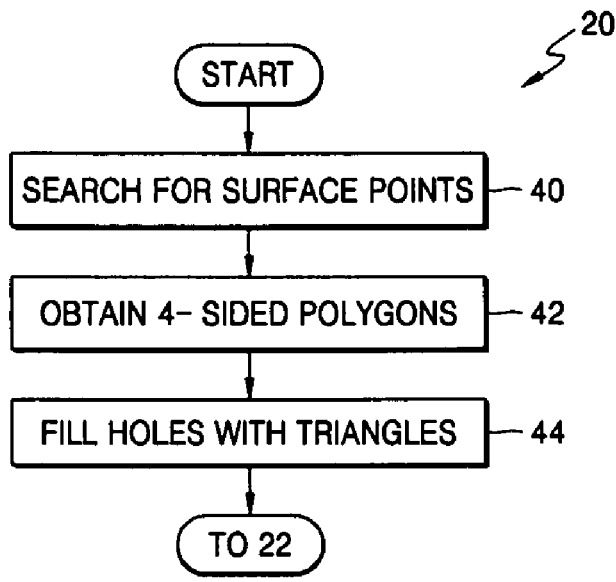
FIG. 4 is a flowchart of Operation 20 illustrated in FIG. 2.

FIG. 4 is a flowchart of Operation 20 illustrated in FIG. 2. Referring to FIG. 4, Operation 20 comprises searching for surface points of the 3D image (Operation 40), obtaining 4-sided polygons using the found surface points (Operation 42), and filling holes with triangles (Operation 44).

When the surface representation unit 10 has the structure illustrated in FIG. 3, Operation 20 can include the processes illustrated in FIG. 4. The surface point search unit 30 receives the 3D image via an input terminal IN2, searches for surface points forming the surface of the input 3D image using quarto division and binary division, and outputs the found surface points to the 4-sided polygon generation unit 32 (Operation 40).

Figure 5:
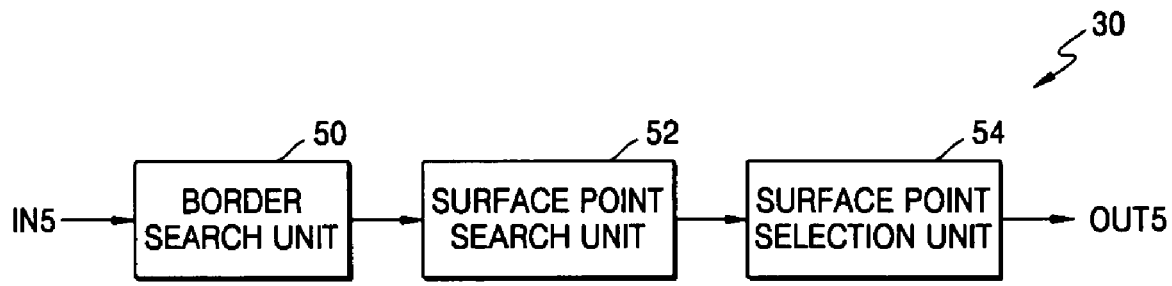
FIG. 5 is a block diagram of a surface point search unit illustrated in FIG. 3.

FIG. 5 is a block diagram of the surface point search unit 30 illustrated in FIG. 3. Referring to FIG. 5, the surface point search unit 30 includes a border search unit 50, a surface point search unit 52, and a surface point selection unit 54.

Figure 6:
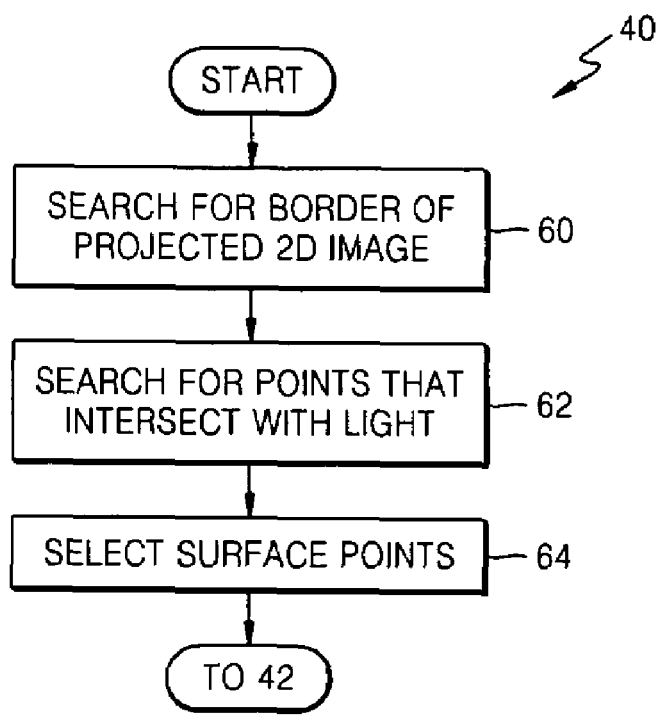
FIG. 6 is a flowchart of Operation 40 illustrated in FIG. 4.

FIG. 6 is a flowchart of Operation 40 illustrated in FIG. 4. Referring to FIG. 6, Operation 40 comprises searching for a border of a two-dimensional (2D) image obtained by projecting the 3D image (Operation 60), and searching for surface points from points that intersect light irradiated on the found border (Operations 62 and 64).

The border search unit 50 receives a 3D image via an input terminal IN5, searches for a border of the 2D image obtained by projecting the 3D image using the quarto division, and outputs the found border to the surface point search unit 52 (Operation 60).

Figure 7:
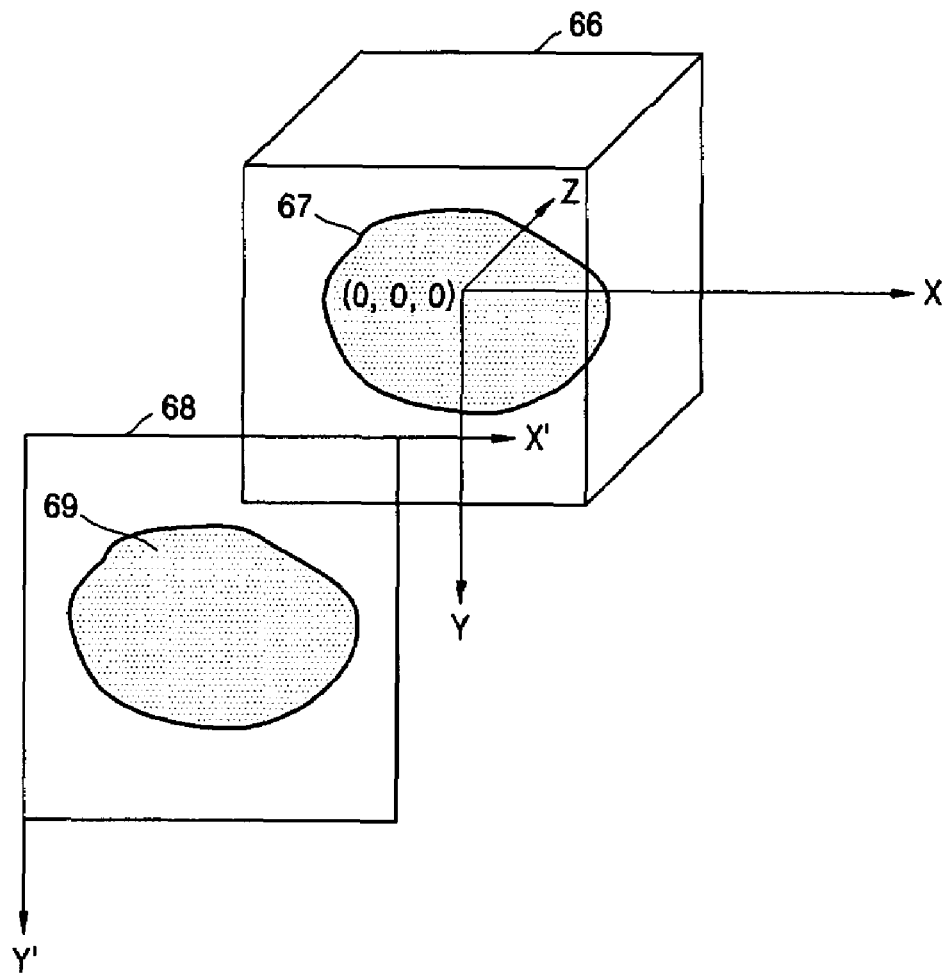
FIG. 7 is an exemplary diagram illustrating a 3D image and a two-dimensional (2D) image obtained by projecting the 3D image.

FIG. 7 is a diagram illustrating a 3D image 67 and a 2D image 69 obtained by projecting the 3D image 67. Referring to FIG. 7, the 3D image 67 that is input via the input terminal IN5 of the border search unit 50 can be represented in a unit cubic space 66. For example, if the center coordinate of the 3D image 67 is at (x,y,z)=(0,0,0), each value x, y, and z can be varied within the range of [−1,1]. The border search unit 50 projects the 3D image 67 onto a 2D plane 68, and obtains the 2D image 69.

Figure 8:
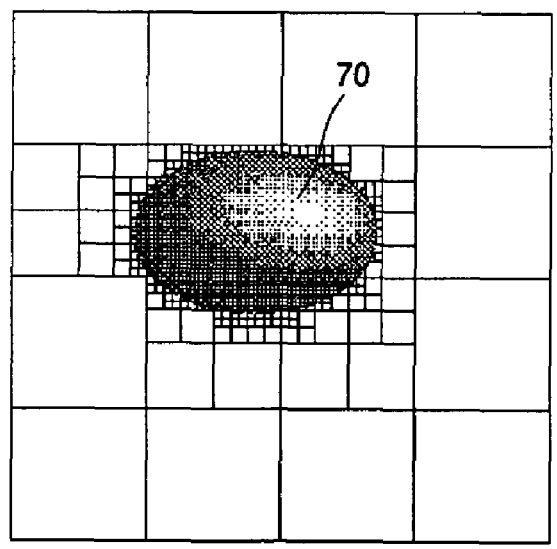
FIG. 8 is a diagram illustrating a quarto division.

FIG. 8 is a diagram for explaining the quarto division on a 2D image 70. Referring to FIG. 8, the 2D image 70 corresponds to the 2D image 69 illustrated in FIG. 7.

The 2D image 70 is repeatedly divided into four parts until a maximum level of the quarto division is obtained. The level of the quarto division QLEV represents how many times an image can be divided into four parts, i.e. a degree division. In detail, the 2D image 70 is divided into four parts one time to determine which of the four parts is in the interior or on the surface of the 2D image 70. A part contacting the surface of the 2D image 70 is not divided into four parts any longer. However, part in the interior of the 2D image 70 is divided into 4 sub-parts. Such a repetitive division of the 2D image 70 into four parts is the quarto division, by which a border of the 2D image 70 is obtained. Information on the border, interior and surface of the 2D image 70 can be obtained and finally buffered by performing the quarto division. An amount of buffering information and a frequency of the quarto division, i.e., an amount of computation required to perform the quarto division, are expressed as below, $$C = \frac{1}{2^{QLEV}} \tag{1}$$

wherein, C denotes the amount of buffering information, $$\Delta o = 2^{QLEV} \quad (2)$$

wherein, $\Delta o$ denotes an increase rate in the amount of computation required to perform the quarto division.

After Operation 60 is performed, the surface point search unit 52 determines a direction to irradiate light on the 3D image using information on the border found by the border search unit 50, irradiates light in the determined direction on the border of the 3D image, searches for points that intersect the irradiated light using the binary division, and outputs the found points to the surface point selection unit 54 (Operation 62), thereby obtaining a group of points of the 3D image that intersect the light. The binary division will now be described below.

FIGS. 9A through 9C are diagrams illustrating binary division of a bar (or a beam) formed by light irradiated in a Z direction. Referring to FIG. 9A, the bar formed by light irradiated in the Z direction of the 3D image 72 is divided into two parts 73 and 74. The surface point search unit 52 determines whether the two parts 73 and 74 of the bar are in the interior of the 3D image 72. If the two parts 73 and 74 of the bar are determined to be interior of the 3D image 72, the two parts 73 and 74 of the bar are divided into four parts 78, 80, 82, and 84, as illustrated in FIG. 9B.

The surface point search unit 52 determines whether the four parts 78, 80, 82, and 84 of the bar are in the interior of the 3D image 72. Since the part 78 of the bar is not in the interior of the 3D image 72, it is not divided any more, whereas, since the parts 80, 82, and 84 of the bar are in the interior of the 3D image 72, they are divided into six parts 86, 88, 90, 92, 94, and 96 as illustrated in FIG. 9C. Any parts of the bar having data are continuously divided into sub-parts.

If the bar is repeatedly divided, points where the 3D image 72 and light intersect each other are found. Such a repetitive division of the bar is called binary division. The bar is repeatedly divided until a maximum level of the binary division is obtained. The level of the binary division BLEV represents how many time a bar can be divided into parts, i.e. a degree of division. A resolution of the divided bar and a frequency of the binary division, i.e., an amount of computation required for the binary division are expressed as below, $$R = \frac{1}{2^{QLEV}} \quad (3)$$

wherein, R denotes the resolution of the divided bar, $$\Delta o' = 2^{BLEV} \quad (4)$$

wherein, $\Delta o'$ denotes an increase rate in the amount of computation required for the binary division.

After Operation 62 is performed, the surface point selection unit 54 selects a surface point located on the surface of the 3D image among points found by the surface point search unit 52, and outputs the selected surface point via an output terminal OUT5 (Operation 64). A group of surface points found by the surface point search unit 52 is composed of interior points and surface points of the 3D image.

FIG. 10 is a diagram illustrating a group of points found by the surface point search unit. The group of points is composed of the surface points 102 and 104 and interior points 106, 108, 110, 112, 114, and 116. Referring to FIG. 10, each of the interior points 106, 108, 110, 112, 114, and 116 includes two neighboring points in the interior of a 3D image 100, whereas each of the surface points 102 and 104 has only neighboring point in the interior of a 3D image 100. Therefore, the surface point selection unit 54 deletes the interior points 106, 108, 110, 112, 114, and 116 and selects the surface points 102 and 104. Each of the surface points 102 and 104 can be expressed with x, y, and z coordinates. An amount of computation required to search for the surface points 102 and 104 is expressed as below, $$\Delta o'' = 2^{QLEV+BLEV} \quad (5)$$

wherein, $\Delta o''$ denotes an increase rate in the amount of computation required to search for the surface points 102 and 104.

Figure 11:
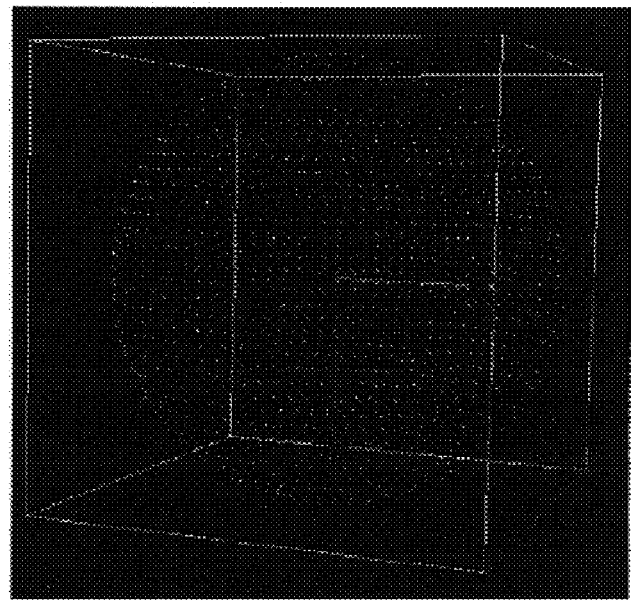
FIG. 11 is a diagram illustrating surface points of an ellipsoid.
Figure 12:
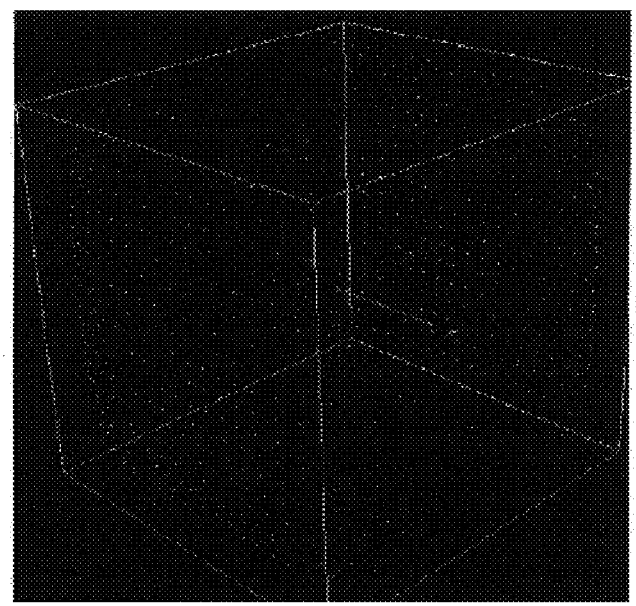
FIG. 12 is a diagram illustrating surface points of a cube.

FIG. 11 is a diagram illustrating surface points of an ellipsoid, and FIG. 12 is a diagram illustrating surface points of a cube. Referring to FIGS. 11 and 12, the surface point search unit 30A illustrated in FIG. 5 can search for surface points of a 3D image.

After Operation 40 is performed, the 4-sided polygon generation unit 32 receives surface points forming the surface of the 3D image from the surface point search unit 30, obtains a plurality of 4-sided polygons by connecting the input surface points to a predetermined direction, and outputs the obtained 4-sided polygons to the hole processor 34 (Operation 42). The predetermined direction includes at least one diagonal direction. For instance, the predetermined direction may be the diagonal direction, a horizontal direction, and a vertical direction, the diagonal direction and the vertical direction, or the diagonal direction and the horizontal direction. Each of the 4-sided polygons obtained by the 4-sided polygon generation unit 32 has two triangles.

Figure 13:
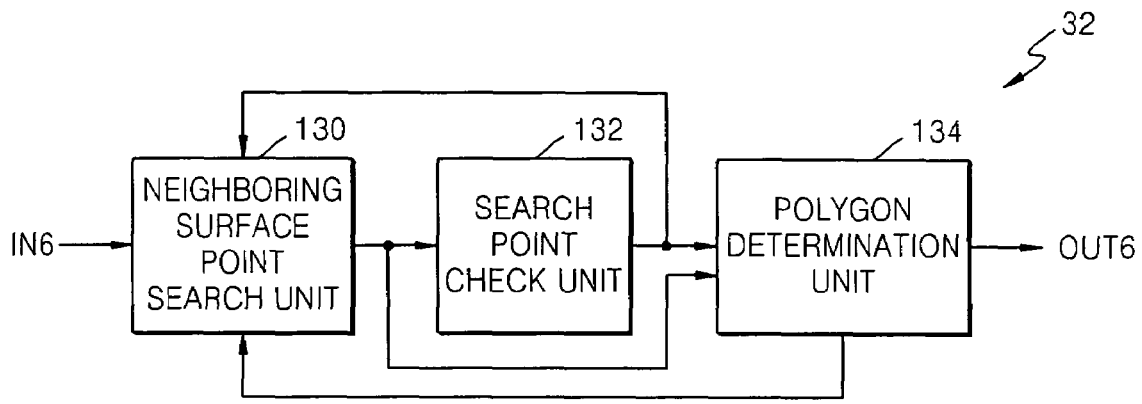
FIG. 13 is a block diagram illustrating a 4-sided polygon generation unit illustrated in FIG. 3.

FIG. 13 is a block diagram illustrating the 4-sided polygon generation unit 32 illustrated in FIG. 3. Referring to FIG. 13, the 4-sided polygon generation unit 32 includes a neighboring surface point search unit 130, a search point check unit 132, and a polygon determination unit 134.

Figure 14:
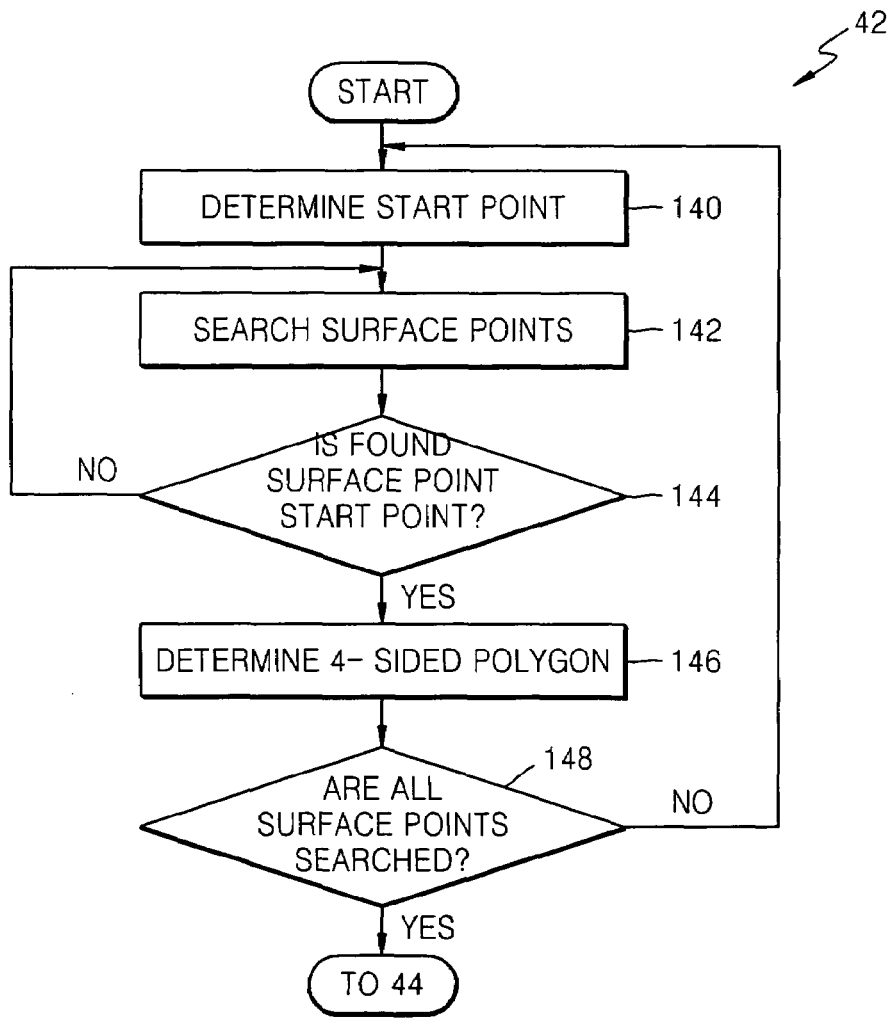
FIG. 14 is a flowchart illustrating Operation 42 illustrated in FIG. 4.

FIG. 14 is a flowchart illustrating Operation 42 illustrated in FIG. 4. Referring to FIG. 14, Operation 42 comprises searching for all the surface points and determining the 4-sided polygons (Operations 140, 142, 144, 146, 148).

The neighboring surface point search unit 130 determines a start point among the surface points in response to a first control signal input by the polygon determination unit 134 (Operation 140).

The neighboring surface point search unit 130 searches for at least one surface point neighboring the start point in a predetermined direction in response to a second control signal input by the search point check unit 132, and outputs the found at least one surface point to the polygon determination unit 134 (Operation 142).

The search point check unit 132 determines if the surface point found by the neighboring surface point search unit 130 is the start point determined in Operation 140, and outputs a result obtained by the determining as the second control signal to the neighboring surface point search unit 130 and the polygon determination unit 134. That is, the search point check unit 132 determines if the surface point found by the neighboring surface point search unit 130 is the start point (Operation 144). Therefore, if the neighboring surface point search unit 130 determines that the surface point found using the second control signal input by the search point check unit 132 is not the start point, it searches for different surface points (Operation 142).

The polygon determination unit 134 determines the 4-sided polygon by connecting surface points found by the neighboring surface point search unit 130 in response to the second control signal, outputs whether or not the 4-sided polygon is determined to the neighboring surface point search unit 130 as the first control signal, and outputs the determined 4-sided polygon via an output terminal OUT6 (Operation 146). If the polygon determination unit 134 determines that the surface point found using the second control signal input by the search point determination unit 132 is the start point, it determines the 4-sided polygon by connecting surface points found by the neighboring surface point search unit 130.

If the neighboring surface point search unit 130 recognizes that the 4-sided polygon based on the start point determined in Operation 140 is determined based on the first control signal input by the polygon determination unit 134, it determines if all the surface points are found, i.e., if there is a surface point that has not been found (Operation 148). If the neighboring surface point search unit 130 determines that all the surface points are not found, it determines one of the surface points that have not found as another start point (Operation 140). Therefore, Operations 142, 144, and 146 are performed on the basis of the determined start point. Operations 140, 142, 144, and 146 are repeatedly performed until all the surface points are found.

Figure 15:
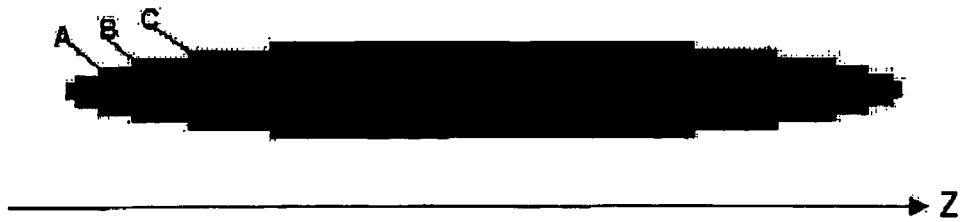
FIG. 15 is a vertical cross-sectional view of an ellipsoid.

FIG. 15 is a vertical cross-sectional view of an ellipsoid. Referring to FIG. 15, black parts indicate interior points, and light parts indicate surface points.

If a 3D image is in space of X, Y, and Z and is irradiated with light in a Z direction, points (or voxels) having the same coordinate along an X axis form a vertical cross-section as illustrated in FIG. 15. Likewise, points (or voxels) having the same coordinate along an Y axis form a horizontal cross-section. All the points are on the vertical and horizontal cross-sections, and thus all the surface points are on the vertical and horizontal cross-sections. When a surface point B is determined as a start point by the neighboring surface point search unit 130, the neighboring surface point search unit 130 searches for surface points A and C neighboring the start point B. That is, the neighboring surface point search unit 130 searches for at least one surface point neighboring the start point on the vertical and horizontal cross-sections. A method of searching for surface points neighboring the start point on the vertical cross-section is similar to a method of searching for surface points neighboring the start point on the horizontal cross-section.

Figure 16:
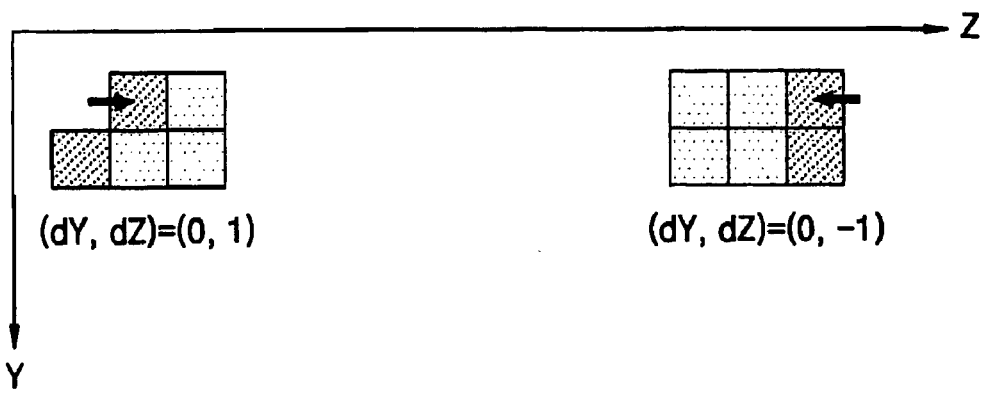
FIG. 16 is a diagram illustrating a conventional method of searching for surface points neighboring a start point.

FIG. 16 is a diagram illustrating a conventional method of searching for surface points neighboring a start point. Referring to FIG. 16, dark parts indicate surface points, and light parts indicate interior points.

Figure 17:
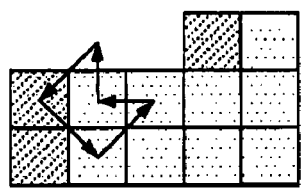
FIG. 17 is a diagram for explaining Operation 142 illustrated in FIG. 14.

FIG. 17 is a diagram explaining Operation 142. Referring to FIG. 17, dark parts indicate surface points, and light parts indicate interior points.

As illustrated in FIG. 16, in the conventional method, surface points neighboring the start point are searched for in a vertical direction. Although not shown, the conventional method can be used to search for surface points neighboring the start point in the vertical direction or a horizontal direction.

However, as illustrated in FIG. 17, the present invention can be used to search for surface points neighboring the start point in the vertical direction or the horizontal direction, and a diagonal direction, and thereby more precisely searching for surface points than when using the conventional method.

If a start point determined in Operation 140 is P, and a first found surface point among surface points neighboring the start point is Q, a current vector from P to Q is expressed as (dY, dZ). dY and dZ are expressed as below, $$dY = y_Q - y_P$$

$$dZ = z_Q - z_P \quad (6)$$

wherein, $y_Q$ denotes the y coordinate of Q, $y_P$ denotes the y coordinate of P, $z_Q$ denotes the z coordinate of Q, and $z_P$ denotes the z coordinate of P.

The neighboring surface point search unit 130 can search for the border of a cross-section in order to perform Operation 142, i.e. search for surface points neighboring the start point. If the neighboring surface point search unit 130 searches for surface points along the border contour of the vertical cross-section counterclockwise, it can sequentially search for the surface points neighboring the start point to the right, front, left and back as illustrated in FIG. 17. However, if the neighboring surface point search unit 130 searches clockwise for the border contour of the vertical cross-section, it can sequentially search for the surface points neighboring the start point to the left, front, right, and back.

Likewise, if the neighboring surface point search unit 130 searches for surface points on the border of the horizontal cross-section, (dY, dZ) are expressed as (dX, dZ). (dY, dZ)=(0,1) is expressed as (dX, dZ)=(0,1), (dY, dZ)=(0,−1) is expressed as (dX, dZ)=(0,−1).

Figure 18:
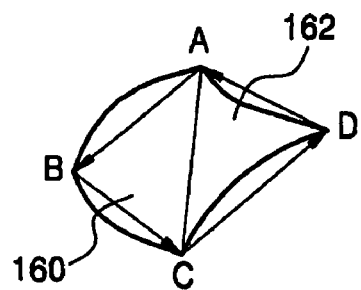
FIG. 18 is a diagram illustrating a 4-sided polygon determined by the polygon determination unit illustrated in FIG. 13.

FIG. 18 is a diagram illustrating a 4-sided polygon determined by the polygon determination unit 134 illustrated in FIG. 13 in which four surface points A, B, C, and D form the 4-sided polygon.

Referring to FIG. 18, if the neighboring surface point search unit 130 sequentially searches for the surface points B, C, and D neighboring the start point A and recognizes that the found surface point is determined as the start point A via the second control signal, the polygon determination unit 134 connects the four surface points A, B, C, and D to form the 4-sided polygon. The polygon determination unit 134 forms the 4-sided polygon by moving down from the start point A in the vertical cross-section of the start point A to the surface point B, moving right from the surface point B in the horizontal cross-section of the surface point B to the surface point C, moving up from the surface point C in the vertical cross-section of the surface point C to the surface point D, and moving left from the surface point D in the horizontal cross-section of the surface point D to the start point A. The 4-sided polygon determined by the polygon determination unit 134 comprises a triangle 160 formed by the surface points A, B, and C, and another triangle 162 formed by the surface points C, D, and A. The 4-sided polygon generation unit 32 illustrated in FIG. 3 generates polygons each having two triangles. The normal direction of the two triangles 160 and 162 may be directed inward or outward. The 4-sided polygon determined by the polygon determination unit 134 may be a double-sided object having two separate triangles having different normal directions. The frequency of connecting the surface points to determine 4-sided polygons is O(N), whereas N denotes a quantity of the connected surface points. O(N) is proportional to N.

Figure 19:
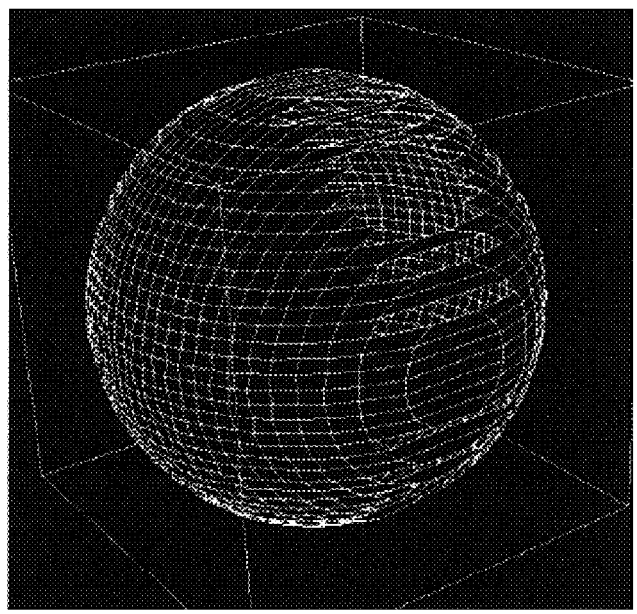
FIG. 19 is a diagram illustrating polygons and holes formed on the surface of a sphere-shaped 3D image.

FIG. 19 is a diagram illustrating polygons and holes formed on the surface of a sphere-shaped 3D image.

Figure 20:
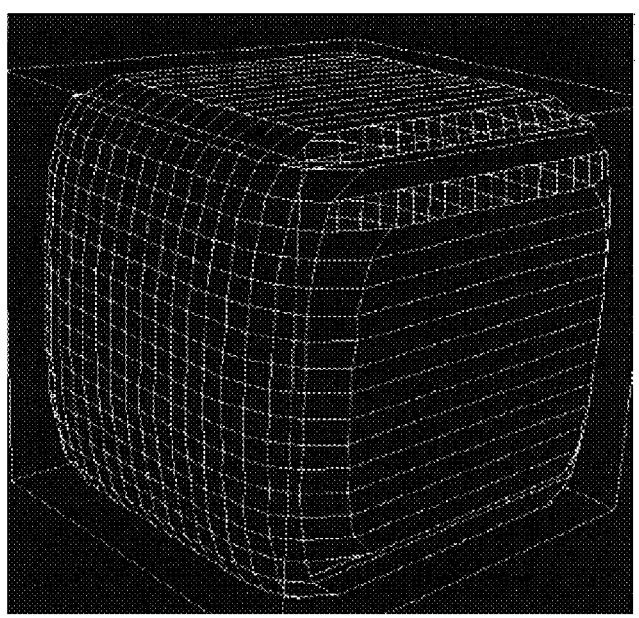
FIG. 20 is a diagram illustrating polygons and holes formed on the surface of a cube-shaped 3D image.

FIG. 20 is a diagram illustrating polygons and holes formed on the surface of a cube-shaped 3D image.

Referring to FIGS. 19 and 20, the 4-sided polygon generation units 32 illustrated in FIGS. 3 and 13 can form polygons on the surface of the 3D image using the surface points found by the surface point search unit 30.

As the start point A is returned to itself as illustrated in FIG. 18, exemplary embodiments illustrated in FIGS. 13 and 14 are realized on the assumption that the start point is sure to be returned to itself. However, if this assumption is not satisfied, a "hole" is produced. The hole will be described later.

After Operation 42 is performed, the hole processor 34 inputs information on the 4-sided polygons obtained by the 4-sided polygon generation unit 32, finds holes formed on surface points that can not determined as a 4-sided polygons on the surface of the 3D image using the information, fills the holes with triangles, and outputs a result obtained by the filling via an output terminal OUT4 (Operation 44).

FIG. 21 is a block diagram illustrating the hole processor 34 illustrated in FIG. 3. Referring to FIG. 21, the hole processor 34 comprises a hole finding unit 170, a hole triangle forming unit 172, a triangle subdivision unit 174, and a triangle fairing unit 176.

FIG. 22 is a flowchart of Operation 44 illustrated in FIG. 4. Referring to FIG. 22, Operation 44 comprises finding holes (Operation 190), filling the holes with triangles (Operation 192), subdividing the triangles (Operation 194), and fairing the triangles (Operation 196).

The hole finding unit 170 inputs information on the 4-sided polygons obtained by the 4-sided polygon generation unit 32 via an input terminal IN7, finds holes using the information, and outputs the holes to the hole triangle forming unit 172 (Operation 190). Operation 190 will now be described in detail.

All edges of a hole border are formed on only a face of a polygon. Therefore, all edges of each of the holes need to be found to find holes. Since the hole finding unit 170 can access a list of faces on which each surface point is formed, it can access a surface point and all the surface points thereto with edges. The hole finding unit 170 finds the number of common faces connected to edges in order to determine which edges are hole border edges or which edges are formed on two neighboring faces. If the number of common face is 1, the edge is determined to be a hole border edge. In this way, the hole finding unit 170 determines whether an edge (hereinafter referred to as "a PQ edge") that connects two surface points P and Q is a hole edge in order to find holes. If the PQ edge is not a hole edge, another surface point is selected. However, if the PQ edge is a hole edge, points which are connected to the surface point Q but are not connected to the surface point P are searched for. If a surface point Q' is found, a QQ' edge is determined to be a hole edge. The hole finding unit 170 finds edges of all the holes until returning to the surface point P and finishes the loop.

FIG. 23A is a diagram illustrating self-intersecting holes, and FIG. 23B is a diagram illustrating holes that are not filled with triangles. Referring to FIGS. 23A and 23B, bold lines indicate border edges.

Referring to FIG. 23A, a hole point Q is connected to more than two hole edges, and is defined as a self-intersecting hole point. Some holes are self-intersecting. The self-intersecting hole point Q is connected to more hole edges than a hole point Q' such that a QQ' edge can be a border edge. Holes are not self-intersecting in thin parts of an object in a 3D image, i.e., when the division of space is very coarse. That the division of space is very coarse indicates that levels of the quarto division and the binary division are low. Referring to FIG. 23B, since holes that are not self-intersecting cannot be filled with triangles, their levels are necessarily increased.

Figure 24:
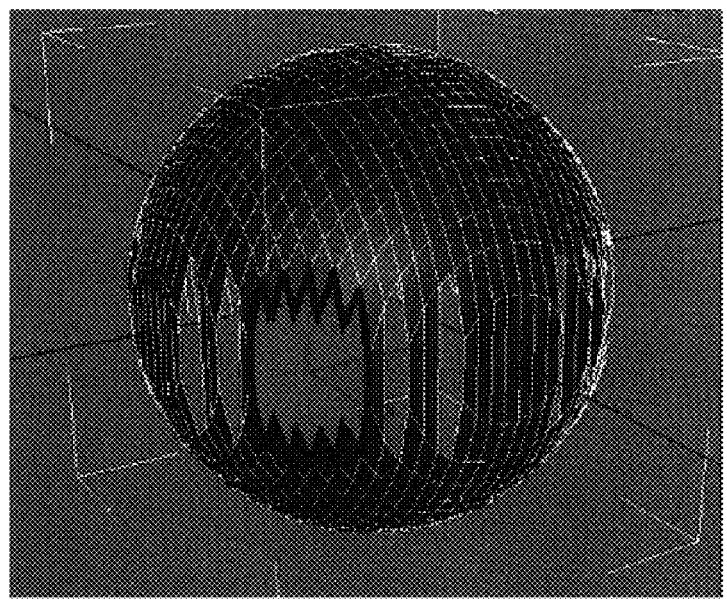
FIG. 24 is a diagram illustrating holes formed on the surface of an ellipsoid-shaped 3D image.

FIG. 24 is a diagram illustrating holes formed on the surface of an ellipsoid-shaped 3D image. Referring to FIG. 24, edges of found holes are indicated with bold lines.

After Operation 190 is performed, the hole triangle forming unit 172 forms triangles by connecting surface points closest to surface points on the boundaries of the found holes, and fills the found holes with triangles (Operation 192).

Operation 192 performed by the hole triangle forming unit 172 will now be described in detail.

Holes are expressed as below, $$\{V_0, V_1, \ldots, V_{n-1}\} \quad (7)$$

wherein, $v_i$ denotes the holes, and n denotes the total number of holes on the surface of the ellipsoid-shaped 3D image.

The holes include a plurality of hole points. Since the hole points are not formed on a plane, the holes include various triangles each having a different region. When triangles are formed to fill the holes, the sum of the areas of the triangles must be minimized. To this end, the hole triangle forming unit 172 forms triangles by connecting surface points closest to surface points belonging to the found hole such that each of the triangles has a minimum weight. The weight of a triangle can be expressed as below, $$A = \frac{1}{4} \times sqrt(4a^2 \times b^2 - (a^2 + b^2 - c^2)^2) \quad (8)$$

wherein A denotes the weight, sqrt denotes a square root, c denotes a face of a triangle that contacts another hole, and a and b denote faces of the triangle that do not contact the other hole. The weight of a triangle is the sum of weights of faces of the triangle. For instance, if $W_{i,j}$ is the minimum weight of a triangle having a sub-polygon, the sub-polygon comprises holes $v_i, \ldots, v_j$. A hole is filled with triangles contained within a triangle, i.e., sub-triangles.

When calculating the minimum weight, in a first operation, when $i=0, 1, \ldots, n-2$, $W_{i,j+1}=0$ (since $W_{i,j+1}$ is an edge), and when $i=0, 1, \ldots, n-3$, $W_{i,j+2}$ is a region of a triangle (i, i+1, i+2), when j=2. In a second operation, j is increased by 1, i=0, 1, ..., n-j-1, and k=i+j. $W_{i,k}$ is expressed as below, $$Wi,k = \min i<m<k[Wi,m+Wm,k+\text{triangle}(Vi,Vm,Vk) \text{ region}] \quad (9)$$

wherein a minimum value of an index m is calculated using $L_{i,k}$.

In a third operation, if j is less than n−1, the second operation is performed, otherwise, a triangle is formed. In a fourth operation, a triangle is again formed using values of $L_{i,k}$ obtained in the second operation.

The four operations are performed to find the minimum weight by searching for smaller parts of polygons while $L_{i,k}$ is repetitively found. If the sum of lengths of edges of a face of triangles is calculated by varying a weight function of the face, the hole triangle forming unit 172 forms a triangle by minimizing the sum of lengths of edges of the face. In connection with the detailed method of sub-dividing polygons and filling holes with triangles, polygons are formed using a minimum value closest to a hole which is not filled with triangles to remove holes, thereby filling holes with smaller polygons.

Figure 25:
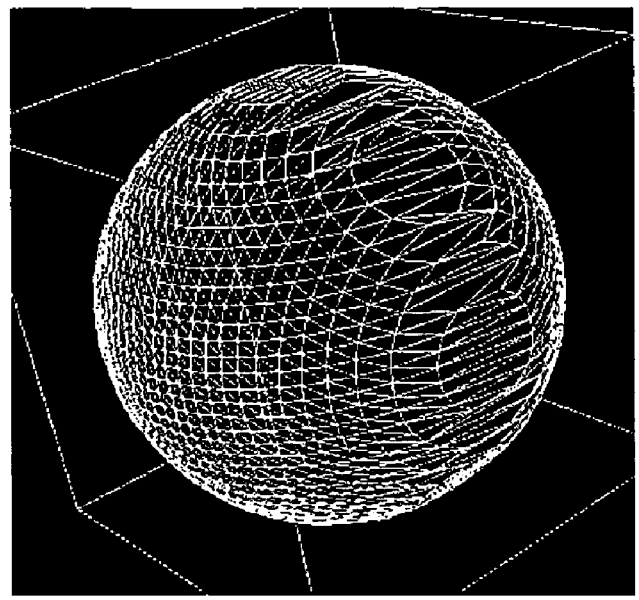
FIG. 25 is a diagram illustrating holes filled with triangles on the surface of an ellipsoid.
Figure 26:
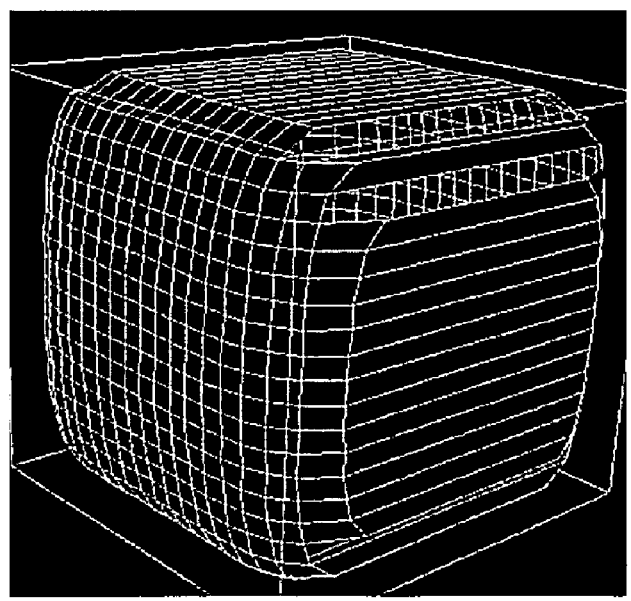
FIG. 26 is a diagram illustrating holes filled with triangles on the surface of a cube.

FIG. 25 is a diagram illustrating holes filled with triangles on the surface of an ellipsoid, and FIG. 26 is a diagram illustrating holes filled with triangles on the surface of a cube. Referring to FIGS. 25 and 26, triangles formed by the hole triangle forming unit 172 can be filled in holes. The quantity of calculations required to fill the holes with triangles can be about $O(n^3)$.

After Operation 192 is performed, the triangle subdivision unit 174 sub-divides triangles formed by the hole triangle forming unit 712 into smaller triangles, and outputs a result obtained by the sub-dividing to the triangle fairing unit 176 (Operation 194).

A mesh will now be described before explaining Operation 194 performed by the triangle subdivision unit 174.

Figure 27:
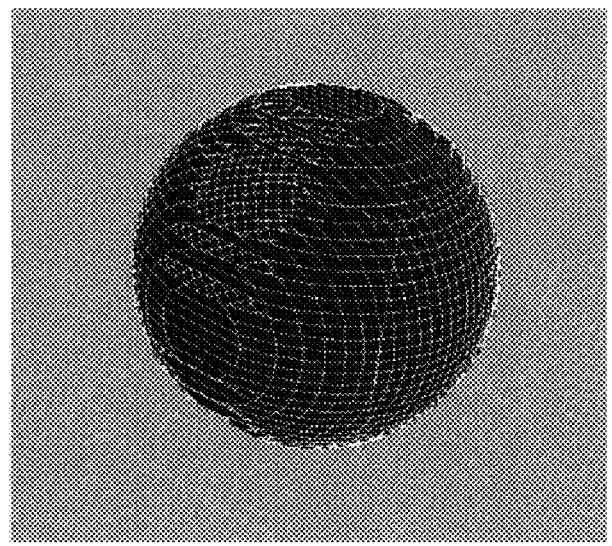
FIG. 27 is a diagram illustrating a sphere having holes.
Figure 28:
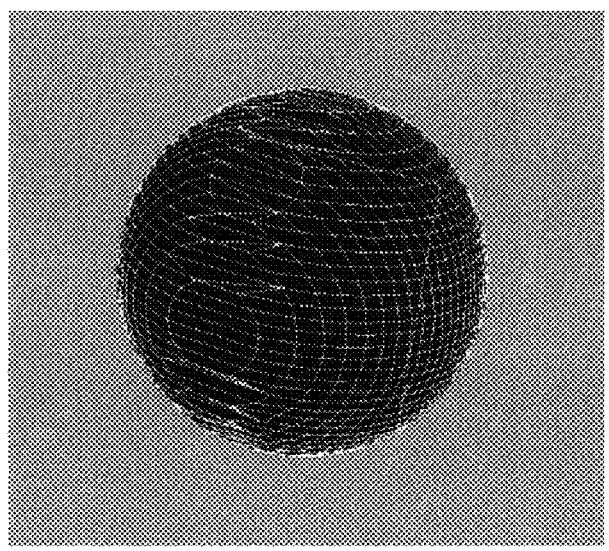
FIG. 28 is a diagram illustrating holes filled with triangles.
Figure 29:
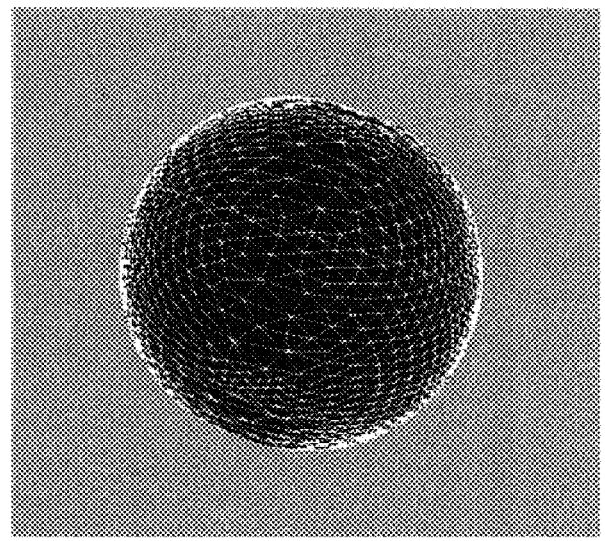
FIG. 29 is a diagram illustrating a sphere additionally having vertices.

FIG. 27 is a diagram illustrating a mesh having holes, FIG. 28 is a diagram illustrating holes filled with triangles, and FIG. 29 is a diagram illustrating a mesh additionally having vertices.

The present invention provides holes in a variety of directed meshes which can be extended to include polygons. In the present invention, holes having islands or gaps between surfaces can be filled. The present invention calculates edge length data of vertices contacting hole edges, extends calculated values into the patching mesh, sub-divides triangles to reduce the edge lengths, and relaxes inside edges to maintain Delaunay-like triangulation as illustrated in FIGS. 27 through 29.

Faces of triangles that are filled in holes do not match each other. Therefore, the triangle subdivision unit 174 sub-divides triangles in order to match the average number of triangles used to fill holes with a value of near meshes.

Figure 30A:
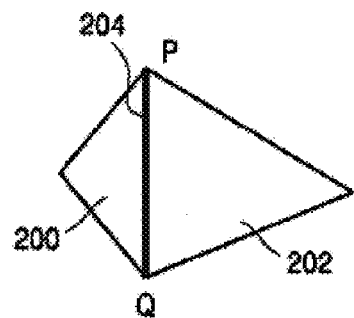
FIGS. 30A and 30B are exemplary diagrams for explaining a triangle subdivision unit in which holes are located.
Figure 30B:
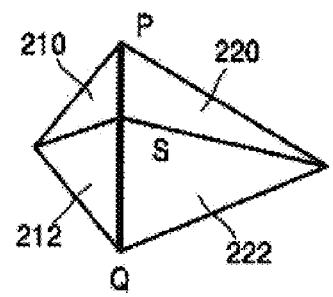

FIGS. 30A and 30B are exemplary diagrams for explaining the hole subdivision unit 174 in which holes are located. FIG. 30A illustrates a 4-sided polygon having two triangles 200 and 202 before the triangles 200 and 202 are sub-divided. FIG. 30B illustrates a 4-sided polygon having four triangles 210, 212, 220, and 222 after the triangles 200 and 202 are sub-divided.

Figure 31:
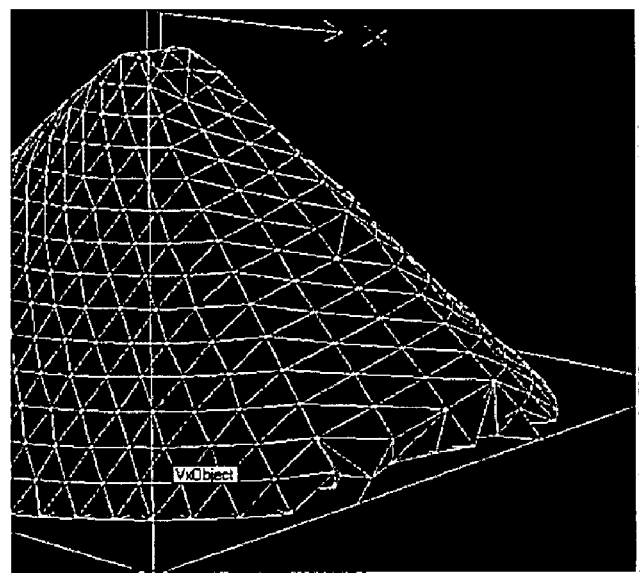
FIG. 31 is a diagram illustrating a cone-shaped mesh having artifacts.
Figure 32:
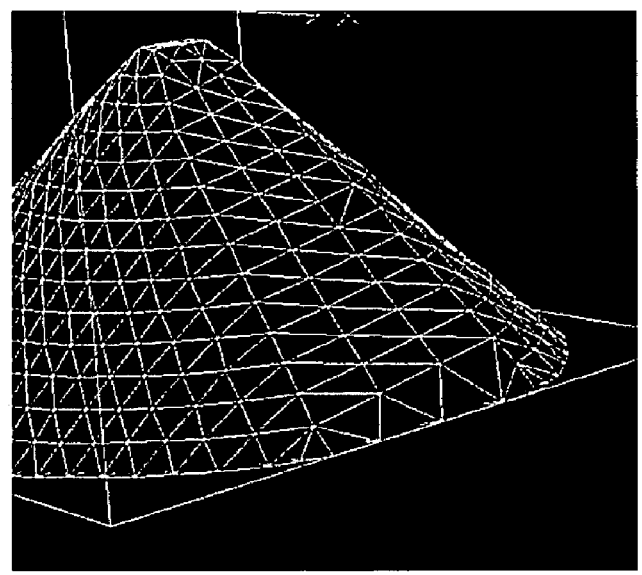
FIG. 32 is a diagram illustrating a cone-shaped mesh without artifacts.

FIG. 31 is a diagram illustrating a cone-shaped mesh having artifacts, and FIG. 32 is a diagram illustrating a cone-shaped mesh without artifacts. Referring to FIGS. 30A and 30B, when an edge of the two triangles 200 and 202 is a hard edge 204 and an angle between the normals of the two triangles 200 and 202 is greater than 45 degrees, the cone-shaped mesh can have artifacts as illustrated in FIG. 31. To remove such artifacts, the hard edge 204 is divided at a centroid S as illustrated in FIG. 30B.

The triangle subdivision unit 174 determines whether to divide the hard edge 204 using the inequality below, $$sqrt(2.0) \times \|PQ\| > \frac{[s(P) + s(Q)]}{2} \quad (10)$$

wherein s(P) denotes an average length of an edge from a point P to a division point S, and s(Q) denotes an average length of an edge from a point Q to the division point S.

If inequality 10 is satisfied, since the length of the edge is too long, the triangle subdivision unit 174 divides the hard edge 204. The coordinate of the division point S that divides the hard edge 204 is as expressed in the equation below, $$C_S = \frac{s(P) \times Q + s(Q) \times P}{s(P) + s(Q)} \quad (11)$$

wherein, $C_S$ denotes the coordinate of the division point S. Equation 11 is used to calculate the centroid when S denotes the division point, and s(P) denotes an average length of an edge from the point P to the division point S. In the case where s(P) is the same as s(Q), the division points obtained by the triangle subdivision unit 174 is the center of the hard edge 204. However, in the case where s(P) is not the same as s(Q), the division point S divides the hard edge 204 in proportion to weights. The triangle 200 of FIG. 30 is divided into the two triangles 210 and 212 of FIG. 30B, and the triangle 202 of FIG. 30 is divided into the two triangles 220 and 222 of FIG. 30B.

If the triangle subdivision unit 174 sub-divides a 4-sided polygon, the artifacts of FIG. 31 can be removed as illustrated in FIG. 32.

After Operation 194 is performed, the triangle fairing unit 176 fairs the triangles used to fill the holes, i.e., streamlines the triangles, and outputs a result obtained by the fairing via an output terminal OUT7 (Operation 196).

Operation 196 performed by the triangle fairing unit 176 will now be described in detail.

An operator $U^1$ for each of points p of a hole is expressed as, $$U^1(p) = -p + \frac{1}{w(p)} \sum_i w(p, i) p(p, i) \quad (12)$$

wherein w(p) denotes the total weight of edges between points p and i as expressed below, and p(p,i) denotes the i neighbor point of the point p.

$$w(p) = \sum_i w(p, i) \quad (13)$$

The sums of all points i combined with points p by an edge are calculated. An operator $U^2$ for the point p is expressed as below, $$U^2(p) = -U^1(p) + \frac{1}{w(p)} \sum_i w(p, i) U^1(p, i) \quad (14)$$

wherein $U^1(p,i)$ denotes the operator $U^1$ for the i neighbor of the point p(p,i).

$U^1$ is 0 at a point p in a plane. $U^1$ is not 0 but $U^2$ is 0 at a point p on a curve. A new position of a point p is searched for by evaluating an equation in which $U^2(p)$ is 0. If a weight s(p,i) is 1 for an edge among edges having lengths with the similar weight w(p,i), $U1^1(p)$ is expressed as below, $$U^1(p) = -p + \frac{1}{n(p)} \sum_i p(p, i) \quad (15)$$

wherein, n(p) is the number of neighboring points combined with the point p by edges. In this case, $U^2(p)$ is expressed as below, $$U^2(p) = -U^1(p) + \frac{1}{n(p)} \sum_i U^1(p, i) \quad (16)$$

The equation $U^2(p)=0$ is linear for the point p. When w=1, it is expressed as below, $$U^2(p) = 0 \quad (17)$$

$$-U(p) + \frac{1}{n(p)} \sum_i U(p, i) = 0$$

-continued $$p - \frac{1}{n(p)}\sum_i p(p, i) + \frac{1}{n(p)}\sum_i \left[-p(p, i) + \frac{1}{n(p, i)}\sum_j p(i, j)\right] = 0$$

$$p - \frac{1}{n(p)}\sum_i p(p, i) + \frac{1}{n(p)}\sum_i \left[-p(p, i) + \frac{1}{n(p, i)}\left[p + \sum_{j, j \neq p} p(i, j)\right]\right] = 0$$

$$p - \frac{1}{n(p)}\sum_i p(p, i) + \frac{1}{n(p)}\sum_i \left[-p(p, i) + \frac{p}{n(p, i)} + \frac{1}{n(p, i)}\sum_{j, j \neq p} p(i, j)\right] = 0$$

$$p + \frac{p}{n(p)}\sum_i \frac{1}{n(p, i)} - \frac{2}{n(p)}\sum_i p(p, i) + \frac{1}{n(p)}\sum_i \frac{1}{n(p, i)}\sum_{j, j \neq p} p(i, j) = 0$$

$$p\left[1 + \frac{1}{n(p)}\sum_i \frac{1}{n(p, i)}\right] = \frac{2}{n(p)}\sum_i p(p, i) - \frac{1}{n(p)}\sum_i \frac{1}{n(p, i)}\sum_{j, j \neq p} p(i, j)$$

$$pv = \frac{2}{n(p)}\sum_i p(p, i) - \alpha(p)$$

$$p = \frac{2}{n(p)v}\sum_i p(p, i) - \frac{1}{v}\alpha(p)$$

If equation 18 below is satisfied, since it is necessary to obtain a root from coordinates of points when weights are calculated, $U^2(p)=0$ is non-linear for the point p, $$w(i,j) = \|i-j\| \quad (18)$$

wherein, □i−j□, ‖i−j‖ denotes the length of an edge that connects the points i and j.

Equation 17 is provided to use a conjugate gradients method.

After Equation $U^2(p)=0$ is solved for each point surrounding a hole, points surrounded by the hole are shifted to found values, and Equation 17 is again determined for each point surrounding the hole.

Figure 33:
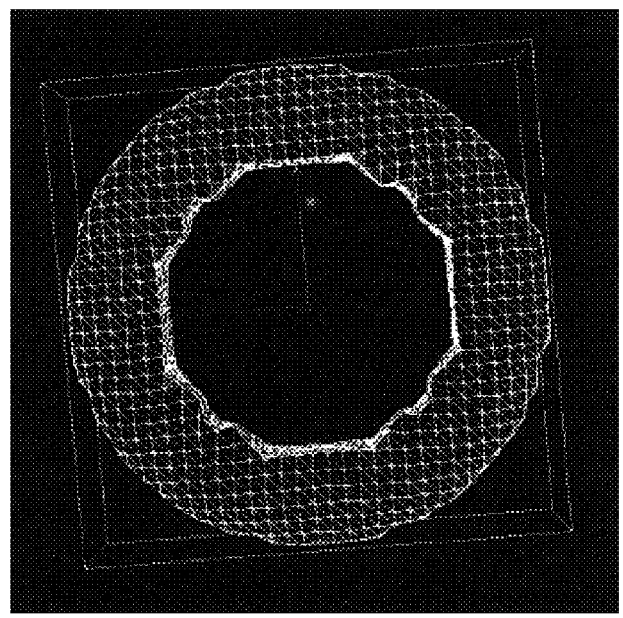
FIG. 33 is a diagram illustrating a torus-shaped 3D image obtained before fairing.
Figure 34:
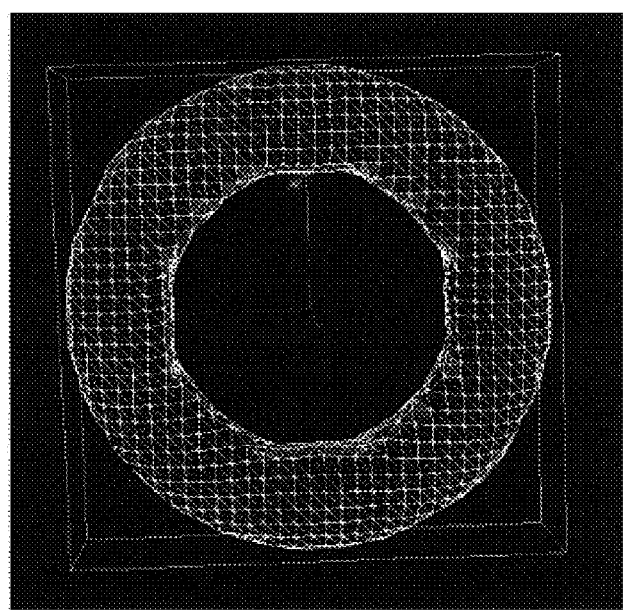
FIGS. 34 and 35 are diagrams illustrating a torus-shaped 3D image obtained after fairing and swelling.
Figure 35:
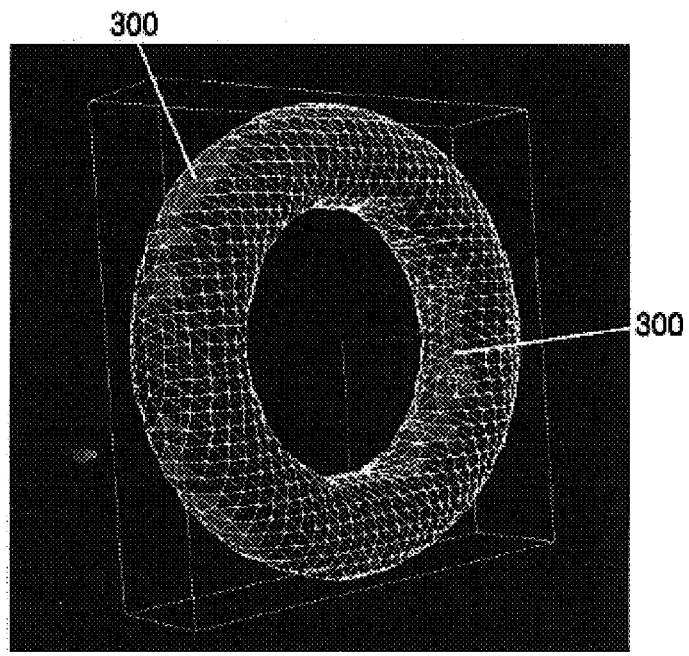

FIG. 33 is a diagram illustrating a torus-shaped 3D image obtained before fairing, and FIGS. 34 and 35 are diagrams illustrating a torus-shaped 3D image obtained after fairing and swelling in which the number of repeating the operation is 15. Referring to FIG. 35, unclear parts 300 indicate points surrounded by holes that are created by combining faces and holes, projecting the combination on a zero region, and filling holes with additional points.

Referring to FIG. 33, an outline of the 3D image before being faired is streamlined by the triangle fairing unit 176 as illustrated in FIGS. 34 and 35.

Figure 36:
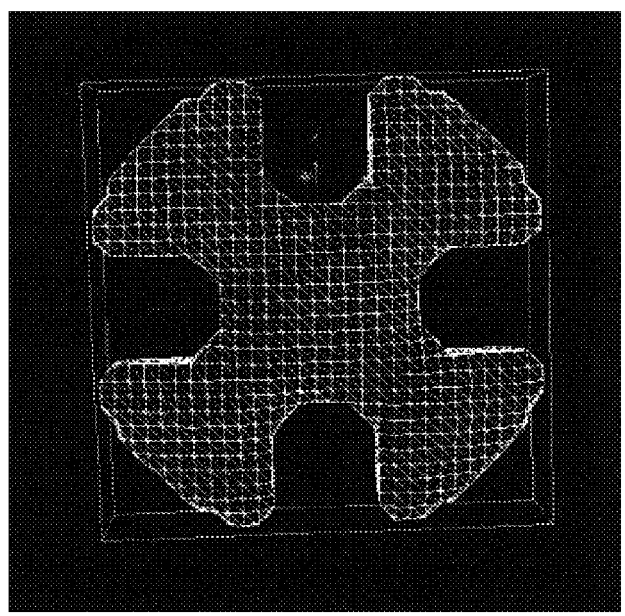
FIG. 36 is a diagram illustrating a cross-shaped 3D image obtained before fairing.
Figure 37:
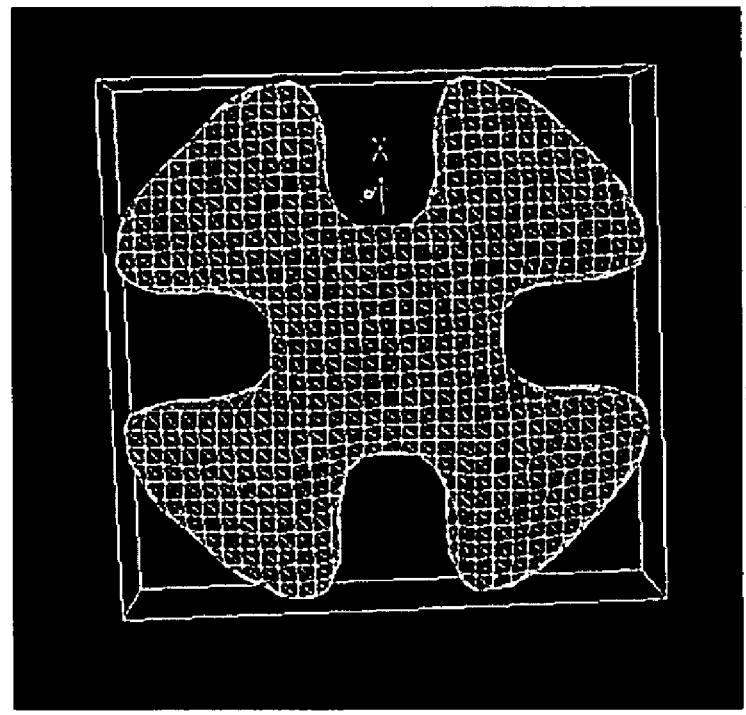
FIGS. 37 and 38 are diagrams illustrating a cross-shaped 3D image obtained after fairing and swelling.
Figure 38:
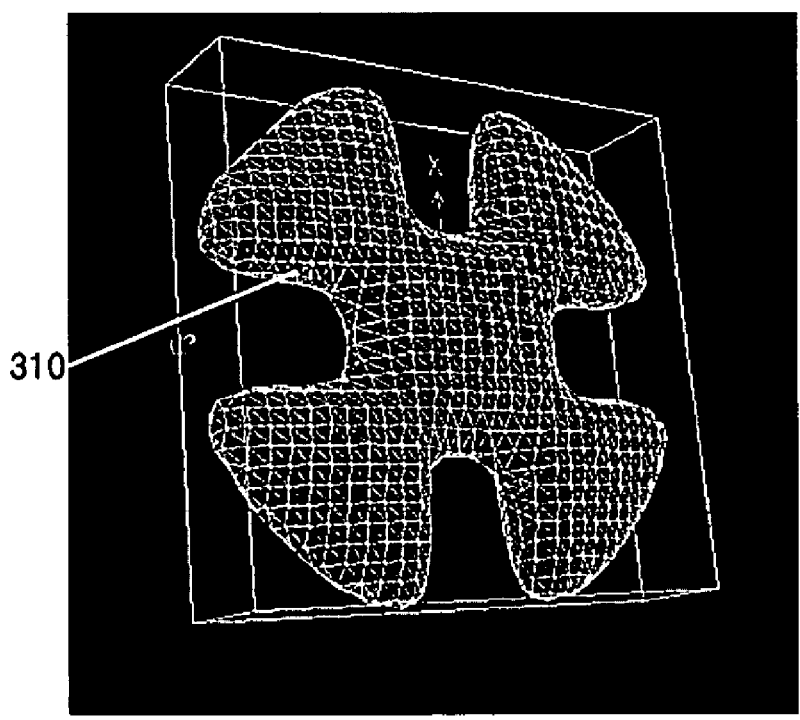

FIG. 36 is a diagram illustrating a cross-shaped 3D image obtained before fairing, and FIGS. 37 and 38 are diagrams illustrating a cross-shaped 3D image obtained after performing 15 fairing and swelling. Referring to FIG. 36, unclear parts 310 indicate points surrounding holes that are created by combining faces and holes, projecting the combination on a zero region, and filling holes with additional points.

Referring to FIG. 36, an outline of the 3D image before being faired is streamlined by the triangle fairing unit 176 as illustrated in FIGS. 37 and 38.

A fast conjugate gradients method will now be described. $U^2(p)$ is expressed as below, $$U^2(p) = -U^1(p) + \frac{1}{w(p)}\sum_i w(p, i)U^1(p, i) = 0 \quad (19)$$

$U^2$ is based on the base $U^1$ as expressed in Equation 12.

When the weights w(p,i) of edges are 1, $U^2(p)=0$ can be accurately solved. When the weights w(p,i) of the edges are □p−i□, it is difficult to accurately solve Equation 19. $U^2(p)$ can be expressed as three equations below, $$U_1^2(x,y,z)=0$$

$$U_2^2(x,y,z)=0$$

$$U_3^2(x,y,z)=0 \quad (20)$$

Three variables $U^2_1$, $U^2_2$, and $U^2_3$ are set to minimize the value of a function expressed below, $$f(x, y, z) = \sqrt{(U_1^2(x, y, z))^2 + (U_2^2(x, y, x))^2 + (U_3^2(x, y, z))^2} \quad (21)$$

The minimum value of this function having a few independent variables is obtained using the fast conjugate gradients method. Points having a few independent variables are initially allocated. The density is determined at the points. Density of functions is a vector and pointing, such that it is necessary to fast operate the functions. Functions are fast reduced by following an anti-gradient. In the conjugate gradients method, the minimum value of the anti-gradient is found before the functions are reduced and after the functions are again increased, and necessary points as expressed below are determined, $$x^{(k+1)} = x^{(k)} - \alpha^{(k)} \nabla f(x^{(k)}) \quad (22)$$

wherein, $x^{(k)}$ denotes points at a k step, and $a^{(k)}$ denotes a shift for an anti-gradient−vf. It is necessary to find a before a function is reduced and after the function is again increased a is shifted according to the anti-gradient until the function is reduced. When a moves along the anti-gradient, the function f of a few independent variables is actually a function having a variable (a). a is a shift for the anti-gradient −1*grad f. A method of obtaining the minimum value of a function having an independent variable is used to find a.

Figure 39:
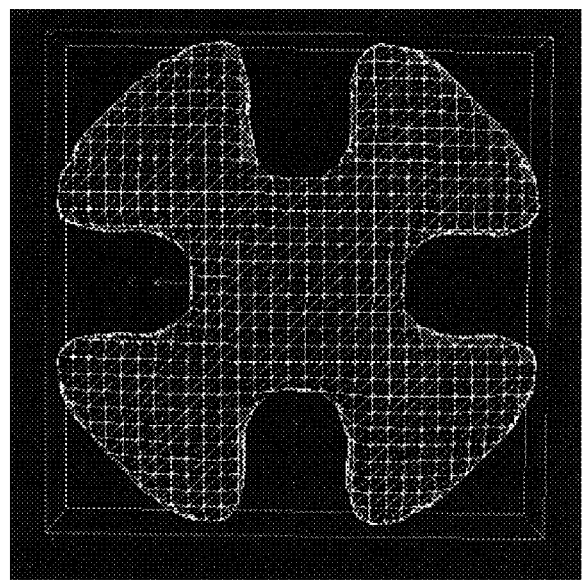
FIG. 39 is a diagram illustrating a cross when w(p,i)=□p−1□.
Figure 40:
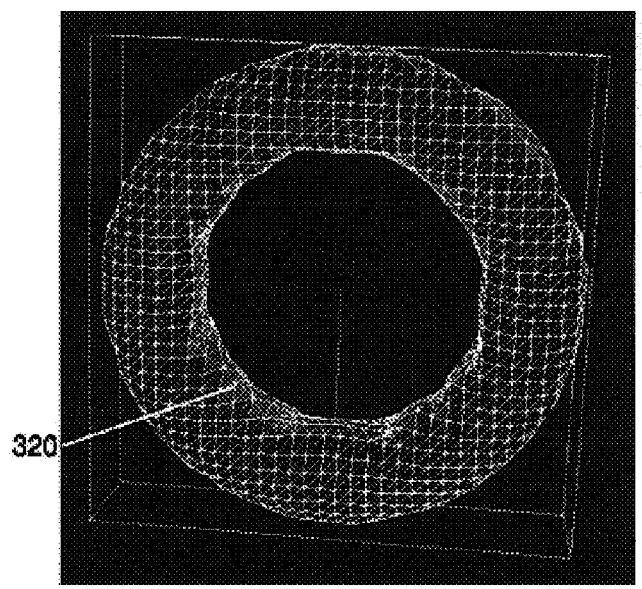
FIG. 40 is a diagram illustrating a torus when w(p,i)=□p−1□.

FIG. 39 is a diagram illustrating a cross when w(p,i)=□p−1□, in which an unclear part is a fairing region. FIG. 40 is a diagram illustrating a torus when w(p,i)=□p−1□, in which an unclear part 320 is a fairing region.

A square-law interpolation method, for example, can be used to approximate a function including a quadratic polynomial for three points. Such an approximation is repeatedly performed until a minimum value having a required accuracy is found. The fast conjugate gradient method is used to determine $U^2(p)=0$ for a weight, and w(p,i)=□p−1□as illustrated in FIG. 39 or 40.

According to an exemplary embodiment of the present invention, the hole processor 34 can be realized by the hole finding unit 170 and the hole triangle forming unit 172, or by the hole finding unit 170, the hole triangle forming unit 172, and the triangle subdivision unit 174, or by the hole finding unit 170, a hole triangle forming unit 172, and the triangle fairing unit 176 unlike the hole processor 34 illustrated in FIG. 21.

According to an exemplary embodiment, the surface expression unit 10 illustrated in FIG. 1 can be realized by the surface point search unit 30. In this case, Operation 20 illustrated in FIG. 2 can be realized by Operation 40. The surface point search unit 30 searches for surface points, and outputs the found surface points via an output terminal OUT2 (Operation 40). The surface points output by the surface point search unit 30 are used to triangulate the surface of the 3D image using a conventional method.

According to an exemplary embodiment of the present invention, the surface expression unit 10 illustrated in FIG. 1 can be realized by the 4-sided polygon generation unit 32. In this case, Operation 20 illustrated in FIG. 2 can be realized by Operation 42. The 4-sided polygon generation unit 32 inputs the surface points which are generated using the conventional method via an input terminal IN3, obtains 4-sided polygons using the input surface points, and outputs the obtained 4-sided polygons via an output terminal OUT3 (Operation 42). The 4-sided polygons output via the output terminal OUT3 are used to triangulate the surface of the 3D image using the conventional method.

According to an exemplary embodiment of the present invention, the surface expression unit 10 illustrated in FIG. 1 can be realized by the surface point search unit 30 and the 4-sided polygon generation unit 32. In this case, Operation 20 illustrated in FIG. 2 can be realized by Operations 40, 42, and 44. The 4-sided polygons output by the 4-sided polygon generation unit 32 via the output terminal OUT3 are used to triangulate the surface of the 3D image.

According to an exemplary embodiment of the present invention, the surface expression unit 10 illustrated in FIG. 1 can be realized by the hole search unit 34. In this case, Operation 20 illustrated in FIG. 2 can be realized by Operation 44. The hole search unit 34 receives the surface points which are generated using a conventional method via an input terminal IN4, and fills with triangles holes formed by surface points which are not determined to form 4-sided polygons on the surface of the 3D image using information on the input 4-sided polygons (Operation 44).

The triangles used to fill the holes by the hole processor 34 are used to triangulate the surface of the 3D image using a conventional method.

According to an exemplary embodiment of the present invention, the surface expression unit 10 illustrated in FIG. 1 can be realized by the 4-sided polygon generation unit 32 and the hole processor 34. In this case, Operation 20 illustrated in FIG. 2 can be realized by Operations 40, 42 and 44.

The information output unit 12 illustrated in FIG. 1 outputs a result obtained by the surface expression unit 10 via an output terminal OUT1 (Operation 22).

Operation 22 performed by the information output unit 12 will now be described in detail.

Figure 41:
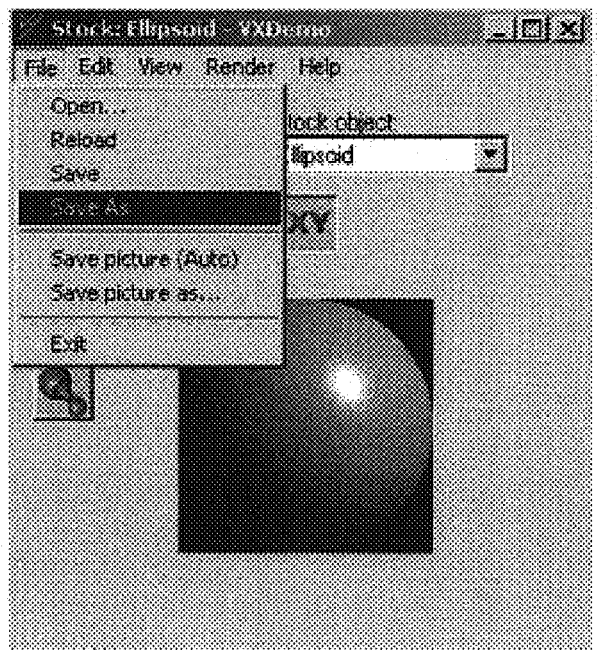
FIG. 41 is a diagram illustrating a user interface screen for exporting a VxDemo-expressed result.
Figure 42:
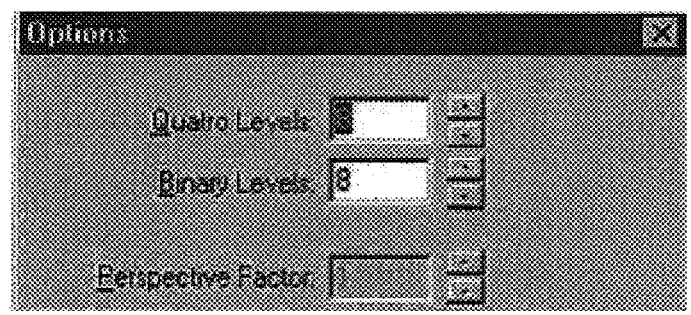
FIG. 42 is a diagram illustrating a user interface screen for determining an export resolution.

FIG. 41 is a diagram illustrating a user interface screen for exporting a VxDemo-expressed result, and FIG. 42 is a diagram illustrating a user interface screen for determining an export resolution. A user interface screen may be coupled to or communicating with one or processors to implement (perform) exemplary embodiments of the present invention. The one or more processors may be part of a computing system. Examples of a computing system may include a computing device, a plurality of computing devices, a network, etc. The user interface may be part of a computing system. Alternatively, the user interface screen may be coupled to and communicating with a computer system.

Referring to FIG. 41, an object is exported in a format determined by vxDemo by selecting Save As from a file menu. If View and Options are sequentially selected from the file menu in order to vary the level of the quarto and/or binary divisions, a window illustrated in FIG. 42 is displayed. A perspective factor is excluded from the displayed window, such that a user can select a desired level in the displayed window. The quarto and binary levels may be selected as 5 and 7, respectively, to briefly view the 3D image. A better resolution can be selected for a final export.

An example of a computer-readable medium storing a computer program for controlling the apparatus for triangulating the 3D image will now be described.

The computer programs for controlling the apparatus for triangulating the 3D image express the surface of the 3D image as triangles without holes and exports the result. The surface of the 3D image is expressed as triangles by searching for surface points forming the surface of the 3D image using quarto and binary divisions, connecting the found surface points in predetermined directions and obtaining a plurality of 4-sided polygons, and, with triangles, filling holes formed by surface points which are not determined to form 4-sided polygons on the surface of the 3D image.

The surface points are found using the quarto division by finding the border of a 2D image formed by projecting the 3D image, projecting light on the 3D image using information on the found border, searching for points that intersect the light projected on the 3D image using the binary division, and selecting surface points among the found points. The 4-sided polygons are obtained by determining a start point among the surface points, searching for a surface point neighboring the start point in a predetermined direction, determining whether the found surface point is the start point, if it is determined that the found surface point is the start point, searching for the start point, if it is determined that the found surface point is not the start point, connecting the found surface point and determining the 4-sided polygon, and determining if all the surface points are found, if it is determined that all the surface points are found, and filling holes with triangles. If it is determined that all the surface points are not found, one of the surface points which is not found is determined as another start point. The holes are filled with triangles by finding holes, and filling the found holes with at least one triangle formed by connecting adjacent surface points surrounding the found hole. In addition, the holes can be filled with triangles by further sub-dividing triangles used to fill the found hole into smaller triangles, and streamlining the sub-divided triangles.

Figure 43:
FIG. 43 is a diagram illustrating a car-modeled 3D image whose surface is formed by triangles.
Figure 44:
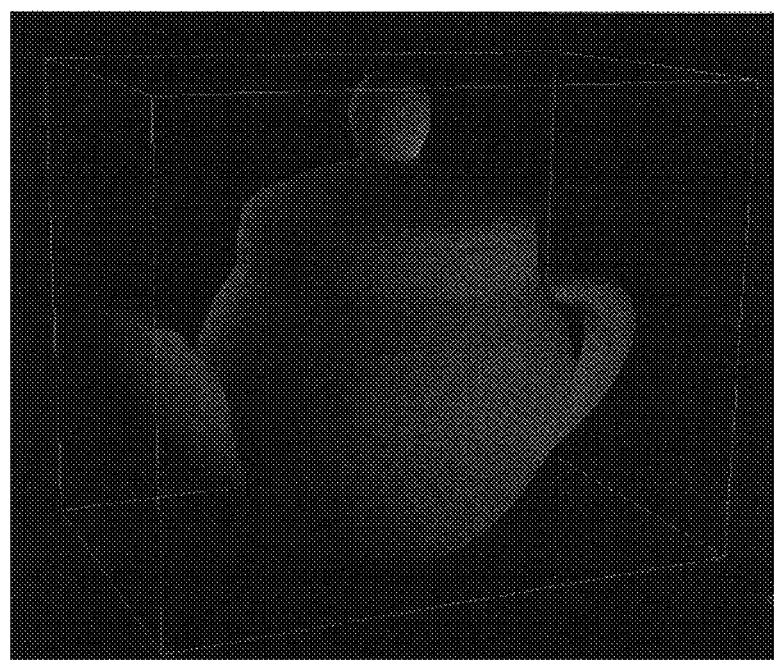
FIG. 44 is a diagram illustrating a kettle-modeled 3D image whose surface is formed by triangles.

FIG. 43 is a diagram illustrating a car-modeled 3D image whose surface is formed by triangles, and FIG. 44 is a diagram illustrating a kettle-modeled 3D image whose surface is formed by triangles.

Referring to FIG. 43, a quarto level is 9, a binary level is 10, the number of faces is 136306, the number of vertices is 68418, and the number of perturbation functions is 83.

Referring to FIG. 44, a quarto level is 9, a binary level is 10, the number of faces is 317188, and the number of vertices is 158613.

In comparison with a conventional step-by-step method of searching for all cells of 3D space in order to find surface points of a 3D image, an apparatus and method for triangulating a 3D image of the present invention, and a computer-readable recording medium storing a computer program for controlling the apparatus uses quarto division and binary division, thereby quickly and easily finding surface points and expressing the surface of the 3D image as a combination of triangles with reliability, general use, and efficiency. In comparison with a conventional apparatus for obtaining 4-sided polygons by connecting surface points in horizontal and vertical directions, the present invention obtains 4-sided polygons by connecting surface points in a diagonal direction, thereby more accurately obtaining 4-sided polygons and reducing the number of holes formed. Therefore, a user can edit a 3D image while personally recognizing modifications of the surface of the 3D image, form triangles using surface points by accurately finding the surface of the 3D image, and remove holes so that the 3D image can be properly displayed. The present invention can be used as a tool to express intuitive data to edit a dynamic object.

The above-described method and apparatus can be implemented by a computer system. A computer system may be one or more devices capable of reading and implementing computer readable instructions. Examples of a computing system may include a computing device, a plurality of computing devices, a network, etc.

In addition to the above-described exemplary embodiments, exemplary embodiments of the present invention can also be implemented by executing computer readable code/instructions in/on a medium, e.g., a computer readable medium. The medium can correspond to any medium/media permitting the storing of the computer readable code.

The computer readable code/instructions can be recorded/transferred in/on a medium/media in a variety of ways, with examples of the medium/media including magnetic storage media (e.g., ROM, floppy disks, hard disks, etc.), optical recording media (e.g., CD-ROMs, or DVDs), and random access memory media. The medium may also be a distributed network, so that the computer readable code/instructions is stored/transferred and executed in a distributed fashion. The computer readable code/instructions may be executed by one or more processors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for triangulating the surface of a three-dimensional (3D) image, the apparatus comprising:
   a surface expression unit to express the surface of the 3D image as triangles without holes; and
   an information output unit to output a result obtained by the surface expression unit,
   wherein the surface expression unit comprises: a surface point search unit searching for surface points forming the surface point of the 3D image using quarto division and binary division,
   wherein the surface points found by the surface point search unit are used to triangulate the surface of the 3D image,
   wherein the quarto division divides a 2D image into four parts and then determines which of the four parts is in the interior or on the surface of the 2D image using at least one processors, and
   wherein the binary division divides a beam of light, which is irradiated on the 3D image, into parts and then determines which of the parts is in the interior of the 3D image.

2. The apparatus of claim 1, wherein the surface expression unit comprises: a 4-sided polygon generation unit obtaining a plurality of 4-sided polygons by connecting the surface points forming the surface of the 3D image in a predetermined direction,
   wherein the predetermined direction includes at least a diagonal direction, and each of the 4-sided polygons obtained by the 4-sided polygon generation unit includes two triangles.

3. The apparatus of claim 2, wherein the 4-sided polygon generation unit comprises:
   a neighboring surface point search unit searching for a surface point neighboring a start point selected from the surface points in response to a first control signal in the predetermined direction in response to a second control signal;
   a search point check unit determining whether the found surface point is the start point, and outputting a result of the determination as the second control signal; and
   a polygon determination unit determining the 4-sided polygon by connecting the points found by the neighboring surface point search unit in response to the second control signal, and outputting whether to determine the 4-sided polygon as the first control signal.

4. The apparatus of claim 1, wherein the surface expression unit comprises: a hole processor forming triangles to fill holes formed by surface points which do not form 4-sided polygons on the surface of the 3D image,
   wherein the triangles used by the hole processor to fill the holes are used to triangulate the surface of the 3D image.

5. The apparatus of claim 4, wherein the hole processor comprises:
   a hole finding unit finding holes; and
   a hole triangle forming unit filling the found hole with at least one triangle by connecting surface points closest to surface points surrounding the found hole.

6. The apparatus of claim 5, wherein the hole processor further comprises: a triangle subdivision unit sub-dividing the triangles filling the hole into smaller triangles.

7. The apparatus of claim 5, wherein the hole processor further comprises: a triangle fairing unit streamlining the triangles filling the hole.

8. The apparatus of claim 1, wherein the surface expression unit further comprises: a hole processor forming triangles to fill holes formed by surface points which do not form 4-sided polygons on the surface of the 3D image.

9. The apparatus of claim 1, wherein the surface point search unit comprises:
   a border search unit using quarto division to search for the border of a two-dimensional (2D) image formed by projecting the 3D image;
   a surface point searching unit searching for points that intersect light projected onto the 3D image using information on the border of the 2D image using binary division; and
   a surface point selection unit selecting the surface points for the found points.

10. A method of triangulating the surface of a 3D image, the method comprising:
   expressing the surface of the 3D image as triangles without holes; and
   outputting a result obtained by the expressing of the surface as triangles,
   wherein the expressing of the surface comprises searching for surface points forming the surface point of the 3D image using quarto division and binary division,
   wherein the quarto division divides a 2D image into four parts and then determines which of the four parts is in the interior or on the surface of the 2D image, wherein the binary division divides a beam of light, which is irradiated on the 3D image, into parts and then determines which of the parts is in the interior of the 3D image, and wherein the method is performed using at least one processor.

11. The method of claim 10, wherein the expressing of the surface further comprises:

obtaining a plurality of 4-sided polygons by connecting the surface points forming the surface of the 3D image in a predetermined direction, and using triangles to fill holes formed by surface points which do not form 4-sided polygons on the surface of the 3D image, wherein the predetermined direction includes at least a diagonal direction, and each of the obtained 4-sided polygons includes two triangles.

12. The method of claim 11, wherein the obtaining of the plurality of 4-sided polygons comprises:

determining a start point from the surface points;

searching for a surface point neighboring the start point in the predetermined direction;

determining whether the found surface point is the start point;

if it is determined that the found surface point is not the start point, searching for a surface point neighboring the start point in the predetermined direction;

if it is determined that the found surface point is the start point, determining the 4-sided polygon by connecting the found surface point; and determining if all the surface points have been found and using triangles to fill holes, if it is determined that all the surface points have been found, wherein if it is determined that not all the surface points have been found, one of the surface points which has not been found is determined to be a start point.

13. The method of claim 11, wherein the using of triangles to fill holes comprises:

finding a hole; and filling the found hole with at least one triangle by connecting surface points closest to surface points surrounding the found hole.

14. The method of claim 13, wherein the using of triangles to fill holes further comprises:

sub-dividing the triangles filling the hole into smaller triangles.

15. The method of claim 13, wherein the using of triangles to fill holes further comprises: streamlining the sub-divided triangles.

16. The method of claim 10, wherein the searching for the surface points comprises:

using the quarto division to search for the border of a two-dimensional (2D) image obtained by projecting the 3D image;

using the binary division to search for points that intersect light projected onto the 3D image using information on the border of the 2D image; and selecting the surface points from the found points.

17. At least one computer-readable medium storing instructions that control at least one processor to perform a method for controlling an apparatus for triangulating the surface of a 3D image, the method comprising:

expressing the surface of the 3D image as triangles without holes; and outputting a result obtained by the expressing the surface as triangles, wherein the expressing of the surface comprises searching for surface points forming the surface point of the 3D image using quarto division and binary division, wherein the quarto division divides a 2D image into four parts and then determines which of the four parts is in the interior or on the surface of the 2D image using the at least one processor, and wherein the binary division divides a beam of light, which is irradiated on the 3D image, into parts and then determines which of the parts is in the interior of the 3D image.

18. The at least one computer-readable medium of claim 17, wherein the searching for the surface points further comprises:

obtaining a plurality of 4-sided polygons by connecting the surface points forming the surface of the 3D image in a predetermined direction, and using triangles to fill holes formed by surface points which do not form 4-sided polygons on the surface of the 3D image, wherein the predetermined direction includes at least a diagonal direction, and each of the obtained 4-sided polygons includes two triangles.

19. The at least one computer-readable medium of claim 17, wherein the searching for the surface points comprises:

using the quarto division to search for the border of a two-dimensional (2D) image obtained by projecting the 3D image;

using the binary division to search for points that intersect light projected onto the 3D image using information on the border of the 2D image; and selecting the surface points from the found points.

20. The at least one computer-readable medium of claim 17, wherein the obtaining of the plurality of 4-sided polygons comprises:

determining a start point from the surface points;

searching for a surface point neighboring the start point in the predetermined direction;

determining whether the found surface point is the start point;

if it is determined that the found surface point is not the start point, searching for a surface point neighboring the start point in the predetermined direction;

if it is determined that the found surface point is the start point, determining the 4-sided polygon by connecting the found surface point; and determining if all the surface points have been found and using triangles to fill holes, if it is determined that all the surface points have been found, wherein if it is determined that not all the surface points have been found, one of the surface points which has not been found is determined to be a start point.

21. The at least one computer-readable medium of claim 17, wherein the using of triangles to fill holes comprises:

finding a hole; and filling the found hole with at least one triangle by connecting surface points closest to surface points surrounding the found hole.

22. The at least one computer-readable medium of claim 17, wherein the using of triangles to fill holes further comprises: sub-dividing the triangles filling the hole into smaller triangles.

23. The at least one computer-readable medium of claim 17, wherein the using of triangles to fill holes further comprises: streamlining the sub-divided triangles.

24. A method in a computer system for triangulating the surface of a 3D image and displaying the 3D image, the method comprising:

displaying a file menu;

in response to selections of the file menu, entering a level for the quarto division and entering a level for the binary division for searching for the surface points;

expressing the surface of the 3D image as triangles without holes;

outputting a result obtained by the expressing of the surface as triangles; and displaying the 3D image based on the result, wherein the expressing of the surface comprises searching for surface points forming the surface point of the 3D image using quarto division and binary division, wherein the quarto division divides a 2D image into four parts and then determines which of the four parts is in the interior or on the surface of the 2D image, wherein the binary division divides a beam of light, which is irradiated on the 3D image, into parts and then determines which of the parts is in the interior of the 3D image, and wherein the method is performed using at least one processor.

25. The method of claim 24, wherein the expressing of the surface further comprises:

obtaining a plurality of 4-sided polygons by connecting the surface points forming the surface of the 3D image in a predetermined direction, and using triangles to fill holes formed by surface points which do not form 4-sided polygons on the surface of the 3D image, wherein the predetermined direction includes at least a diagonal direction, and each of the obtained 4-sided polygons includes two triangles.

* * * * *

UNITED STATES PATENT AND TRADEMARK OFFICE
CERTIFICATE OF CORRECTION

| | |
|---|---|
| PATENT NO. | : 7,675,516 B2 |
| APPLICATION NO. | : 11/347428 |
| DATED | : March 9, 2010 |
| INVENTOR(S) | : Keunho Kim |

It is certified that error appears in the above-identified patent and that said Letters Patent is hereby corrected as shown below:

Column 17, Line 61, change "processors," to --processor,--.

Signed and Sealed this

First Day of June, 2010

David J. Kappos
*Director of the United States Patent and Trademark Office*